(12) United States Patent
Davis

(10) Patent No.: US 6,625,399 B1
(45) Date of Patent: Sep. 23, 2003

(54) NON-LINEAR FLASH AND LIGHTNING DETECTION DEVICE

(76) Inventor: Richard F. Davis, 28665 Road P.8, Dolores, CO (US) 81323

( * ) Notice: Subject to any disclaimer, the term of this patent is extended or adjusted under 35 U.S.C. 154(b) by 0 days.

(21) Appl. No.: 10/307,583

(22) Filed: Dec. 2, 2002

Related U.S. Application Data

(63) Continuation-in-part of application No. 09/864,626, filed on May 23, 2001, now abandoned, which is a continuation-in-part of application No. 09/544,758, filed on Apr. 7, 2000, now Pat. No. 6,243,242, which is a continuation-in-part of application No. 09/135,698, filed on Aug. 18, 1998, now abandoned.

(51) Int. Cl.⁷ .......................... G03B 17/38; G01W 1/00
(52) U.S. Cl. .................... 396/263; 396/267; 73/170.24
(58) Field of Search ................... 396/263, 267, 396/56, 59; 73/170.24; 324/72; 340/539.28, 601

Primary Examiner—W. B. Perkey
(74) Attorney, Agent, or Firm—Mills Law Firm PLLC

(57) ABSTRACT

A method and device for detecting and/or photographing unregulated light flash events such as lighting strikes and muzzle flashes during both daylight and night time conditions is disclosed. The present device utilizes a photodiode sensor in conjunction with a photoresistor to control feedback gain of a transimpedance amplifier thereby providing non-linear amplification and therein constant sensitivity to detect an unregulated, omni-directional flash of light and produce an output signal that is input to an analog comparator circuit whereat a predetermined threshold level is set to prevent false triggering of the isolation relays and/or camera shutter. The output from the comparator circuit is input to a timer circuit to produce a signal of sufficient duration to trigger the isolation relay(s) and/or camera shutter. The output signal from the timer circuit is sent to an isolation relays and/or an infrared coded pulse generator depending on the features of the particular associated equipment in order to release the camera shutter or to protect an electronic or electrical device from the damaging effects of the lightning return stroke. In an alternative embodiment the functions of the comparator circuit, the timer circuit and the coded pulse generator are carried out by a programmable logic device such as a mixed signal processor with analog, digital, real time clock and non-volatile RAM capability wherein the lightning event processing functions are incorporated into the program code. In a further embodiment, the coupling circuit is tuned wherein motion of an object is detected. In yet a further embodiment, multiple photosensor arrays are utilized in conjunction with non-linear amplification and computing means to determine the location of flash events and to control associated equipment.

77 Claims, 18 Drawing Sheets

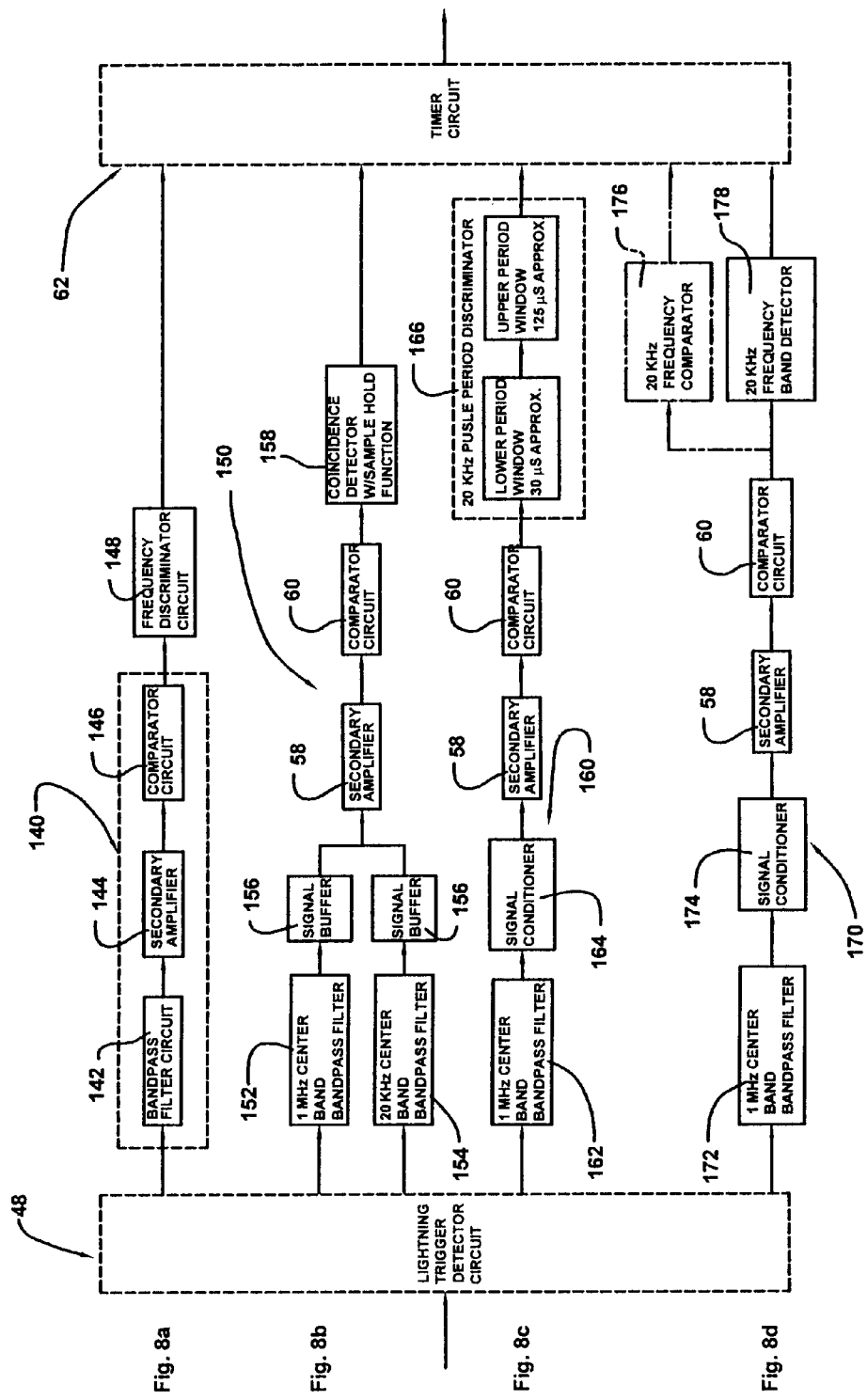

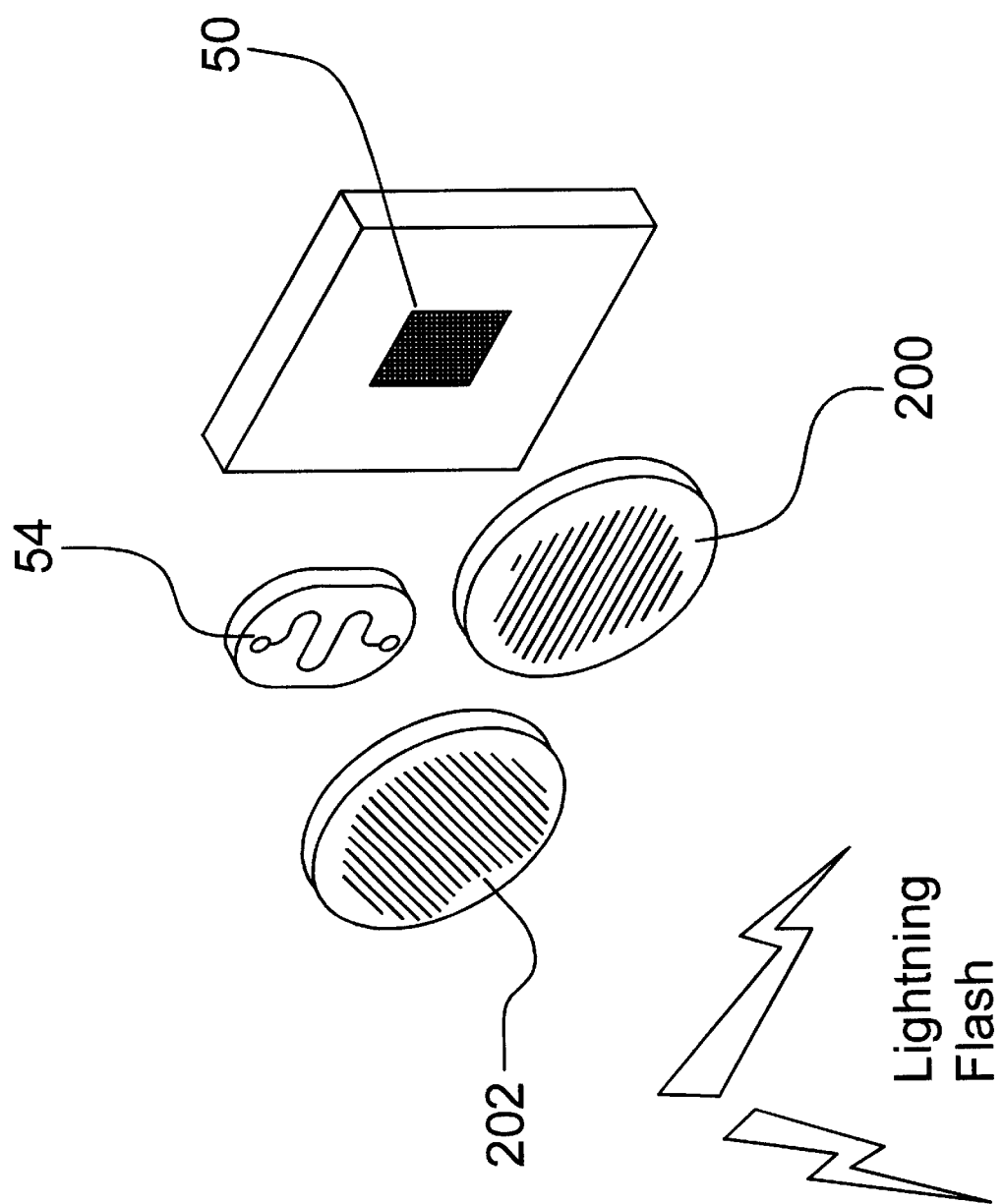

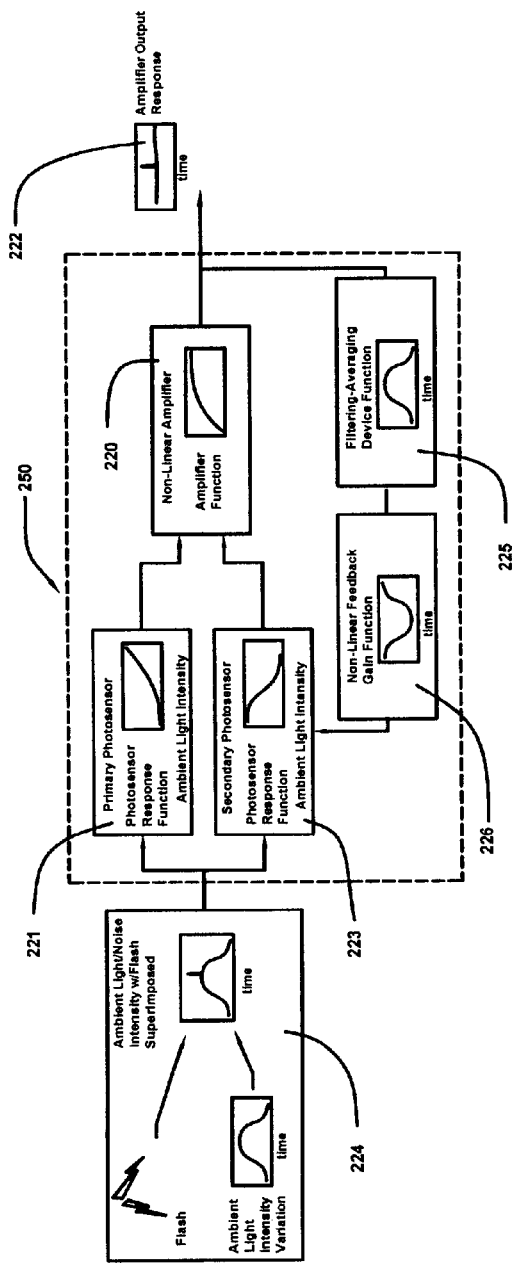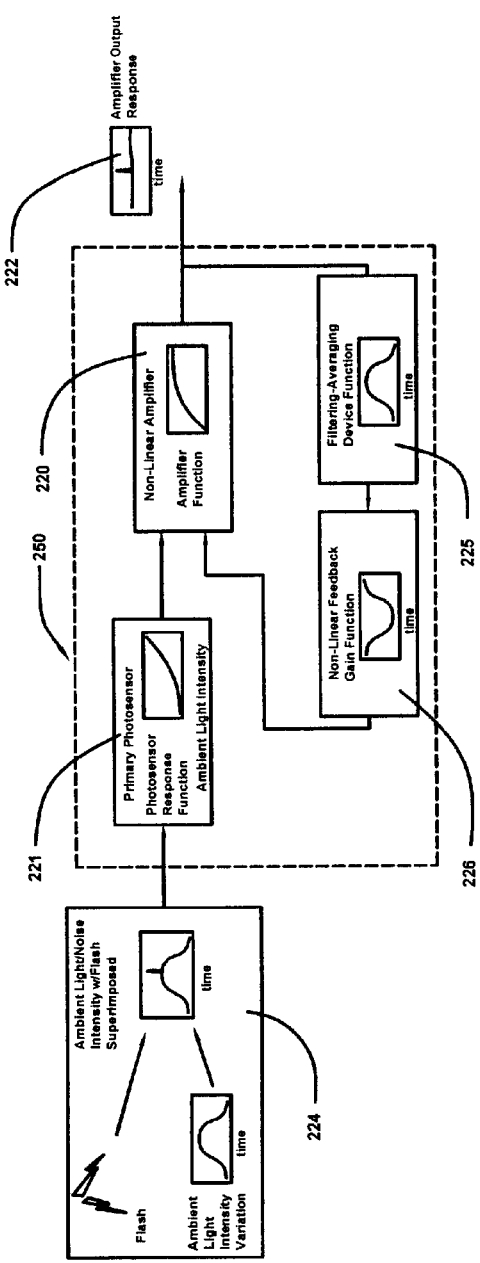

NON-LINEAR FLASH AND LIGHTNING DETECTION DEVICE

RELATED APPLICATIONS

This application is a continuation-in-part application of U.S. Ser. No. 09/864,626 filed on May 23, 2001 (abandoned), which is a continuation-in-part application of U.S. Ser. No. 09/544,758 filed on Apr. 7, 2000 (now U.S. Pat. No. 6,243,242), which is a continuation-in-part application of U.S. Ser. No. 09/135,698 filed on Aug. 18, 1998 (abandoned), all in the name of R. F. Davis and entitled "Non-Linear Amplifier" and "Photographic Lightning Trigger Device".

FIELD OF INVENTION

The present invention relates generally to devices for detecting flash events and, more particularly, to a method and apparatus for detecting lightning and rapid pulse light flashes.

BACKGROUND OF THE INVENTION

The detection of lightning and rapid pulse light flashes have numerous applications ranging from photography, lightning protection devices, the detection of muzzle flashes and the like.

Prior art devices have provided the ability to detect lightning flashes, however they have lacked the ability to perform this function with sensitivity and selectivity necessary to be functional. Furthermore, they have lacked the ability to detect flashes as well during the day or at night.

For the purpose of this invention, an apparatus for the detection of lightning and rapid pulse light flashes have very similar design characteristics and wherein such an apparatus can perform the detection of rapid pulse light flashes and various forms of lightning through the use of properly selected filtering techniques. Furthermore, such a device can be provided wherein detection sensitivity is constant throughout the daytime and at night.

Lightning photography is a popular form of artistic expression commonly found in pictorial books and magazines. Such dramatic photographs of bolts of lightning have great visual impact.

Scientific uses of lightning photography are also well known to those skilled in the art. Lightning photography with conventional cameras is restricted to the well-known practice of using long exposure times, usually at night or in low ambient light levels. The lightning event is captured on film during the time period when the camera shutter is held open, which is typically five to ten minutes, requiring the use of a camera tripod.

However, the methods of the prior art are tedious and time consuming and do not provide for lightning photography during normal daylight hours. Further, the photographer must remain out of doors with the camera equipment and be exposed to the hazards of lightning.

Thus, the present invention has been developed to provide a lightning trigger device capable of interfacing with many commercially available cameras having sufficiently fast shutter lag times during both daylight and nighttime conditions.

In addition, the present camera triggering method can be practiced by utilizing the camera's remote shutter release, thereby photographing lightning events from a safe distance. Further, the cost of the present lightning trigger device is substantially lower in comparison to other automated methods of photographing lightning.

The present invention may also be utilized to detect the initiation of the stepped leader phase of the lightning event for preemptively disconnecting susceptible electronic and electrical devices via fast acting relays before the incipient and destructive return stroke occurs. Devices that may benefit by preemptive protection from the damaging effects of the return stroke and subsequent electromagnetic pulses (EMP) include electronic and electrical devices such as computers, telephones, household and industrial appliances, and the like. Back up power supplies may be incorporated with the lightning trigger detection device to ensure continuous operation and protect against a loss of service, data or critical operation.

The present invention may also be utilized to detect rapid pulse light flashes produced by sources such as a muzzle flash form a gun wherein an indication device or associated equipment may be activated in response thereto.

DESCRIPTION OF RELATED PRIOR ART

U.S. Pat. No. 5,184,215 to Barker discloses an automated system for detecting and recording lightning strikes in the vicinity of power lines. In one embodiment of the invention, the automated system includes a toroid surge sensor; a phototransistor optical sensor located within a pole mounted housing; a magnetic loop sensor; a control circuit for one or more cameras and/or video camcorders; and a power supply all contained within a weather-tight housing. Such a system clearly lacks portability and is designed specifically for the monitoring of electrical power transmission utilities.

U.S. Pat. No. 5,448,161 to Byerley et al. discloses an optical radiation detector for lightning or other light signals such as pulses, bursts, flashes, and steady fluctuations. A silicon photodiode or other light-sensitive silicon device is arranged to receive light signals in the infrared, visible, ultraviolet, and wide-band ranges, etc.

U.S. Pat. No. 3,759,152 to Fletcher discloses a system for monitoring and recording lightning strikes within a predetermined area with a camera having an electrically operated shutter and means for advancing the film in the camera after activating the shutter. The system includes an antenna for sensing electrical field changes which generate a signal that is fed to an electronic circuit for operating the shutter of the camera.

U.S. Pat. No. 3,712,195 to Harvey discloses an apparatus for photographing meteors in a selected area of the sky only at times meteors are likely to be passing through the area. A photo multiplier is pointed in the direction of the designated area. When a meteor passes through the area, the signal output of the photo multiplier increases, activating a camera.

U.S. Pat. No. 3,700,336 to Clegg discloses a method for optically detecting lightning radiation in both daylight and nighttime conditions. A silicon solar cell receives light radiation, converting them to electrical signals which are amplified and electronically processed for recording purposes. However, this apparatus is not used in conjunction with photographic equipment.

U.S. Pat. No. 3,934,259 to Krider discloses an all-sky camera apparatus for time-resolved lightning photography. This invention utilizes a pair of all-sky cameras which are disposed with their respective lenses pointing vertically. One of the cameras is rotated about an axis passing through the zenith while the other is maintained in a stationary disposition to determine the time development of lightning discharge.

U.S. Pat. No. 5,255,038 to Suzuka discloses a remote control apparatus of a camera having a camera body with a finder eyepiece window including an infrared receiver which is associated with the shutter of a camera body. A remote release signal emitted from an infrared transmitter is received by the infrared receiver to release the shutter of the camera body.

U.S. Pat. No. 4,707,127 to Goedken discloses an auto-wireless shutter release control that will allow the user to take a photograph by remote control.

U.S. Pat. No. 4,051,496 to Iida et al. discloses a remote control camera having a fitting member for mounting thereon a signal receiving device to receive a remote control signal, the body of the signal receiver, when fitted on the camera body, serving to cover the entire eye-piece on the camera body to intercept light entering into the camera body through the eye-piece.

U.S. Pat. No. 4,926,284 to Eugenio discloses a lightning protection device for directly sensing a predetermined critical electrostatic field intensity of the stepped leader to prevent the formation of the return stroke. The device uses a charge storing sphere and a varistor grounding device to dissipate the charge of the otherwise incipient return strokes.

U.S. Pat. Nos. 5,521,603 and 5,297,208 to Young disclose are electric field sensing devices for lightning detection and method for deactivating electrical equipment.

U.S. Pat. No. 4,276,576 to Uman discloses a lightning protection device utilizing electric or magnetic field responsive detectors and means for isolating or grounding electrical equipment.

U.S. Pat. No. 5,057,820 to Markson et al. discloses an optical warning system for distinguishing between strobe light flashes and lightning flashes and providing audio and visual indication of detection to an operator.

SUMMARY OF THE INVENTION

After much study of the above described problems, the present invention has been developed to provide a lightning trigger and flash detection device. In photographic applications, the invention will provide the artistic and/or recreational photographer with a compact, lightweight device which allows the user to safely obtain lightning photographs using a handheld camera while inside a car, house, or other protected structure.

The user may also use the lightning trigger and flash detection device attached to such a handheld camera mounted on a camera tripod when photographing lightning events from a safe distance utilizing the camera's remote electronic or infrared shutter release.

The lightning trigger and flash detection device can also be used as a sensor for utilizing the initiation of the stepped leader for preemptive protection of electrical and electronic devices before the damaging return strokes can occur.

More particularly, the photographic lightning trigger and detection device functions to detect an unregulated, omni-directional flash of light by the use of a photodiode sensor and a trans-impedance amplifier with an automatic variable gain control which causes the camera shutter to be released in response to the lightning flash. The device further incorporates a timing function for preventing undesirable repetitive film exposures when through-the-lens method of sensing of the lightning flash is utilized.

Furthermore, in photographic applications, the automatic camera metering circuits may be preactivated for minimizing the camera shutter lag time while at the same time isolating the camera and lightning trigger voltage supplies.

Detection may be accomplished in several manners utilizing distinctive characteristics of the lightning flash. Whereas, prior art detection methods rely upon sensing the wide-band event of the lightning flash or the presence of unusually high electromagnetic field intensities for predicting lightning activity, the present invention employs the additional preemptive benefit of detecting the stepped leader. Two significant characteristics suitable for detection are utilized; the pulsing propagating components of the stepped leader, and the relatively long duration between the initiation and completion of the stepped leader.

The lightning trigger and flash detection device can also be used to detect light flashes from unregulated or regulated, non-natural point sources such as flash strobes and muzzle flashes. In flash detection applications, such as those caused by muzzle flashes a threat indicating system can be employed to alert and/or activate associated equipment.

Furthermore, through the selection of the appropriate filtering/coupling circuit, motion detection can be accomplished by the sensing change of reflected light off moving objects and thence incident upon the flash detection sensors.

Accordingly, the invention may be employed to benefit several forms of existing technologies and practices, lightning photography and detection, motion detection and flash event detection being advantageous applications.

In view of the above, it is an object of the present invention to provide a photographic lightning trigger device which is practical for use by the artistic and/or recreational photographer using a handheld camera.

Another object of the invention to provide a sensing system for detecting the initiation of the stepped leader phase of a lightning stroke for the protection of auxiliary electrical loads.

Another object of the present invention is to provide a photographic lightning trigger device which functions to respond to an unregulated, omni-directional light event and to instantaneously cause the camera shutter to be released.

Another object of the present invention is to provide a sensing device for the detection of rapid pulse light flashes and the controlling of associated equipment.

Another object of the present invention is to provide a method for optically detecting events utilizing a photodiode and trans-impedance amplifier with an automatic variable gain control for use in conjunction with a handheld camera or other auxiliary devices.

Another object of the present invention is to provide a method for enhanced flash impulse detection while maintaining constant sensitivity to varying ambient conditions by utilizing non-linear amplification and variable threshold comparator means.

Another object of the present invention is to provide a device that allows the user to safely obtain lightning photographs using a handheld camera while inside a car, house, or other protective structure.

Another object of the present invention is to provide a photographic lightning trigger device which enables lightning photography to be performed during both daylight and nighttime conditions.

Another object of the present invention is to provide a photographic lightning trigger device of a lightweight and compact size which may be integrated into the camera housing, mounted directly onto the camera shoe fitting, or incorporated into a small pocket-sized enclosure.

Another object of the present invention is to use fiber optics for focusing a lightning flash sensor to the field of view of the camera lens.

Another object of the present invention is to provide a preemptive lightning sensor for protecting electrical devices from lightning related electrical damage.

Another object of the present invention is to provide a means for minimizing the shutter lag time prior to recording a lightning flash.

Another object of the present invention is to provide a means for motion detection and controlling an auxiliary device.

Another object of the present invention is to provide for a method of sensing the initiation of the stepped leader and controlling an auxiliary device prior to the occurrence of the return stroke.

Another object of the present invention is to provide a selectable mode for detecting cloud to ground and multiple impulse flashes and to reduce film consumption.

Another object of the present invention is to provide for a method of protecting electronic and electrical devices through the use of lightning trigger-detection device by preemptively disconnecting and protecting electronic devices from damaging electrical surges before the subsequent return strokes occur.

Another object of the present invention is to provide a means of flash detection wherein the sensitivity to flash or impulse events is constant throughout varying ambient levels.

Another object of the present invention is to provide a means of RF impulse detection wherein the sensitivity to flash or impulse events is constant throughout varying background noise levels.

Another object of the present invention is to provide for a method of multi-mode rapid pulse flash, motion detection and ground flash detection device for controlling associated equipment.

BRIEF DESCRIPTION OF THE DRAWINGS

The above and other objects and advantages of the present invention will become apparent upon reading the following detailed description taken in conjunction with the accompanying drawings in which:

FIGS. 8a through 8d are block diagrams of further embodiments for the interface between the lightning trigger circuit and the timer circuit for the lightning trigger device;

FIG. 9 is a schematic view of the spectral filters and lens for the photodiode sensor and photoresistor sensor;

FIGS. 10a through 10e are block diagrams of further embodiments of the lightning trigger system showing the arrangement of the non-linear amplification functions.

DETAILED DESCRIPTION OF THE PREFERRED EMBODIMENTS

Figure 1:
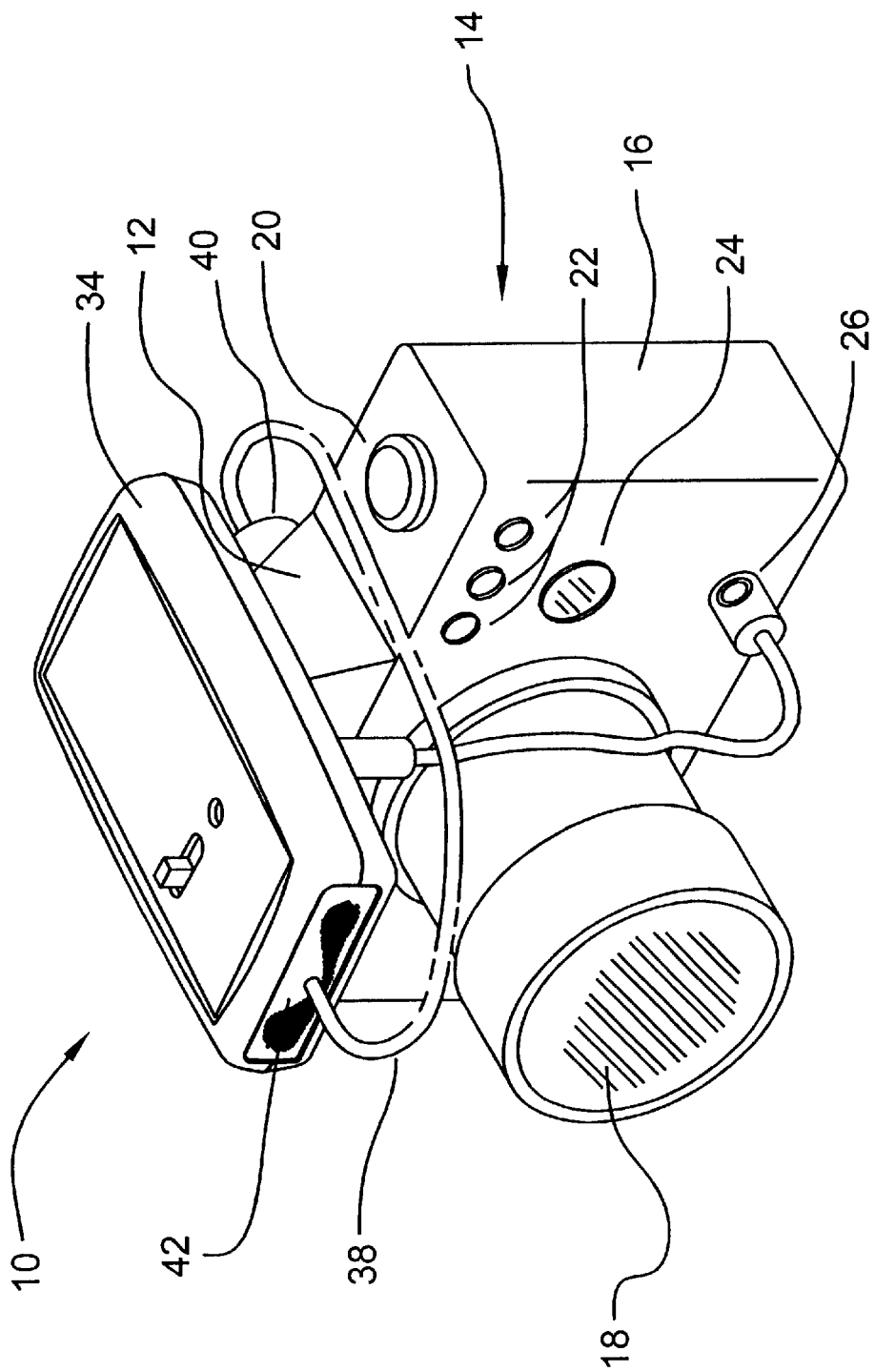
FIG. 1 a is perspective view of the lightning trigger device of the present invention shown mounted on a handheld camera.

Prior to discussing the lightning trigger device of the present invention in detail, it may be beneficial to briefly review some basic definitions and characteristics of lightning. There are two major types of lightning flashes, intracloud and cloud-to-ground. The primary characteristic of a lightning flash is the transfer of electrical charge. The secondary characteristic is the electromagnetic fields that result from the changing electric field. The tertiary characteristic is the luminous corona that results from the ionization of atmospheric gases around the electrical discharge path.

Cloud-to-ground lightning flashes are noted for the luminous bolt, which is dramatic and potentially destructive to the object struck. Intracloud lightning flashes are most often observed as an illumination of the cloud, wherein the cloud acts as a diffuser and scatters the light of the flash channel.

In the simplest form, lightning flash detection may involve merely detecting the bulk event such as for photographic purposes. However, detection of a lightning flash at the earliest event in the sequence provides a significant advantage over bulk event detection. More particularly, a cloud-to-ground flash comprises a sequence of events that occur over several hundred milliseconds including the preliminary breakdown process, the stepped leader, the initial return stroke, dart leaders and subsequent return strokes. Each of the foregoing has characteristics that are unique while sharing other characteristics in common.

For purposes of the present invention, certain characteristics of the stepped leader are used for facilitating preemptive activities, photographic and protective. Thus, in photographic applications, the detection of the stepped leader is used for initiating shutter opening prior to the return stroke. Such preemptive sensing is also used for disconnecting susceptible devices prior to the occurrence of the destructive characteristics of the return stroke.

As discussed in greater detail below, unique characteristics of stepped leader utilized in the present invention include a 20 kHz center band frequency of the periodic luminous and electromagnetic impulses, a rapid impulse rise time representative of a 1 MHz saw tooth wave form, and a preemptive interval of about 20 milliseconds prior to the initial return stroke. Singularly or in combination these characteristics are employed preemptively for initiation and protection activities with associated devices.

For bulk lightning flashes, the return stroke characteristics may be effectively utilized, including peak amplitude and electromagnetic and luminous rise times, i.e. about 1 microsecond. The latter is also commonly characteristic of the preliminary breakdown process and the dart leader.

Against this background, various optical and antennae sensor may be used, coupled with feedback sensors, and filtering, comparing, and discriminating circuitry for initiating various activity, control, and protection tasks.

For further reference, as recited in the book, Lightning by Martin A. Uman, and for purposes of this application, a ground strike lightning flash is characterized by a so called leader stroke, typically 20 milliseconds in duration followed by a series of return strokes lasting about one millisecond. Such return strokes typically occur from 40 to 80 milliseconds apart for the duration of the ground strike lightning flash, typically 10 to 200 milliseconds. Such phenomena are additionally described in "Spectrum of the Stepped Leader", by Richard E. Orville, Journal of Geophysical Research; "The Relative Light Intensity Produced by a Lightning Stepped Leader", by E. Phillip Krider; Journal of Geophysical Research; and "Spectrum of the Lightning Dart Leader" by Richard E. Orville, Journal of Atmospheric Sciences.

More particularly, a cloud-ground lightning flash is characterized by plural phases or events. Initially, an electric charge builds up between a cloud and the ground. Subsequently, a first phase or preliminary breakdown process of electrically charged regions occurs, then a process referred to as a "stepped leader", establishes a conductive channel between cloud and ground. Thereafter a series of return strokes are propagated. The return strokes are spaced by "dart leaders". The return strokes dissipate the charge between cloud and ground.

The aforementioned preliminary breakdown process is further characterized by an initial intracloud luminous phase, lasting a hundred milliseconds or more, that precedes the emergence of the stepped leader from the cloud base. This breakdown process is characterized by a wide-band RF emissions spectrum in the very low frequency range of 0 to 130 kHz. The electric field change during the preliminary breakdown is characterized as being bipolar with impulses having a 10 microsecond rise time and 50 microseconds duration, with several 1-microsecond width pulses superimposed over the initial half cycle.

The stepped leader is 2 to 30 milliseconds in duration, typically about 20 milliseconds, and characterized by a periodic progression of propagating impulses that establish the primary cloud-ground conductive channel for the return stroke. The luminous characteristics of each propagating impulse are asymmetric and typically have a 1-microsecond rise time and a 1 to 2 microseconds half-peak fall time, characteristic of a 1 MHZ saw tooth wave form. The corresponding luminous frequency of the stepped leader for sensing purposes possesses a primary frequency range of 500 kHz to 2,500 kHz. The propagating luminous impulses typically have a between pulse period of 30 to 125 microseconds, representative of a center band frequency of 20 kHz (50 microseconds average period). The luminous characteristics of the stepped leader, typically 20 to 100 times less intense than the return stroke, are observed in a spectral range of 560 to 660 nanometers (nm). The RF characteristics of the stepped leader are wide-band with a peak amplitude frequency of 20 kHz. The stepped leader electric field peak rise time is on the order of 1-microsecond or less corresponding to an approximate frequency of 500 to 2,500 kHz.

The return strokes are contrasted by as having a luminous phase with a 1 microsecond rise time, and 70 microseconds duration. The return strokes occur in a series, spaced 40 to 80 milliseconds apart for the duration of the lightning flash. A typical lightning flash lasts between 40 and 200 milliseconds. The return stroke has wide-band RF characteristics, ranging from DC to and beyond the microwave region (1 Ghz). The electric field pulse of the return stroke is characterized as having a peak amplitude frequency of 5 kHz with the first return stroke rise time of 2 to 8 microseconds to half peak followed by a rise time of half to peak on the order of 100 nanoseconds.

The dart leader immediately precedes each return stroke. Typically, the dart leader has a luminous duration of about 25 microseconds. There is also a luminous delay of about 10 microseconds between the dart leaders and the return strokes. The dart leader has wide-band RF emissions similar to the return stroke. With increasing emission frequency, there is an increasing period between the luminous completion of the dart leader of 0 to 250 microseconds. The luminosity of dart leader is approximately 12% of that of the succeeding return stroke.

Cloud to cloud lightning events may also occur through distinct electrical paths as in the case of the ground strike described above. Cloud to cloud lightning flashes may also possess the stepped leader phase.

Intracloud lightning may occur as so-called sheet lightning with near whole cloud involvement. A single slow moving continuously luminous leader lasting several hundred milliseconds superimposed with millisecond duration pulses is common with intracloud flashes.

A distinct advantage of sensing the stepped leader optically is that there are very few naturally occurring or manmade sources of light, which are unregulated omni-directionally pulsed at the stepped leader frequencies. In contrast, there are many sources of noise that can interfere with and cause false signals through lightning detection systems utilizing the radio frequency (RF) range, such as the simple switching of household and industrial appliances. Furthermore, the wide-band RF emissions of lightning correspond very closely with frequencies assigned by the United States Federal Communications Commission including the RF frequency ranges of 6 to 300 kHz are assigned to maritime, land and aeronautical navigation and communications and higher ranges corresponding to lightning frequencies, such as 540 to 1,700 kHz assigned to AM radio transmissions. Further, the RF 20 kHz center band frequency and the one-microsecond electric field rise times (500 to 2,500 kHz) are also distinctive.

The spectral characteristic of a lightning flash of this invention is in the range of approximately 300 to 1100 nm. This range is the principal emission spectrum of lightning in comparison to the full spectrum of a lightning flash being in the range of 300 Gm (1 kHz) and extending beyond ultraviolet 300 nm (1 PHx). Also of interest are the luminous phase constituents of the preliminary breakdown, stepped leader and return stroke characterized by the one-microsecond rise times (approximately 500 kHz to 2,500 kHz) of their respective luminous phases and the luminous stepped leader representative impulse center frequency of 20 kHz.

In the present invention, a lightning trigger and detection device may optically sense discrete phase of the lightning flash, including the stepped leader, the dart leader and/or the return strokes. Further, the device discriminates between the ambient light level conditions and the lumination conditions of the lightning flash. Such detection is used to trigger the camera's shutter in order to capture the subsequent lightning strokes on film. The lag time capability of the camera, i.e. the time period when the shutter is triggered to release on the time the shutter actually opens, is of critical importance in order to achieve the shutter release in time for subsequent return lightning strokes to be recorded.

Single lens reflex cameras with so-called mirror lockup or pellicle mirrors and electronic releases offer the fastest lag times. The Nikon F-5 in manual mode with the mirror pre-released and utilizing the electronic release provides a lag time of 21 milliseconds. The Canon EOS 1NRS and RT pellicle mirror cameras have lag times of less than 8 ms. Other cameras suitable for use with the present lightning trigger device include the Nikon F-4, the Sigma SA-5, and the Bronica GS-1. Digital cameras such as the Nikon D1 series, Canon D30 and EOS 1-D and Olympus E10 and E20 are also compatible with the present lightning trigger device having meter activation and shutter release functions operating in a similar manner as film cameras and having adequate lag times. Cameras with marginal lag times that have electronic releases suitable for multiple stroke lightning flashes include the Nikon N2000 (96 ms) and the Canon Rebel (144 ms). Range finder cameras with an adaptation to accommodate an electronic and/or infrared release in manual mode also provide adequate lag times to record a lightning flash.

However, many commercially available cameras are not suitable for use with the present lightning trigger device. Such cameras may incorporate an electronic and/or infrared release, but do not have an override for automatic focusing and other functions. As a result, the lag times of such cameras are too slow to capture the lightning flash.

Based on the foregoing and referring to FIG. 1, a lightning trigger device 10 in accordance with the present invention will now be described in further detail. More particularly, the device 10 is mounted on the flash shoe fitting 12 of a camera 14, such as a Nikon F-5. The camera 14 includes a housing 16, a lens 18, a manual shutter release 20, auto focus and associated sensors 22, an infrared coded pulse receiver 24, and an electronic shutter release connector 26.

Since such single lens reflex cameras with the enumerated features are well known to those skilled in the art, further detailed discussion of the same is not deemed necessary.

In the embodiment shown, the lightning trigger device 10 is mounted on the flash shoe 12 of the camera 14 merely for the convenience of fixturing the device thereon. It will be understood that the lightning trigger device 10 does not integrate any functions between the camera 20 and the camera flash, nor does it connect electrically through any communication means with the flash shoe.

It is emphasized that the lightning trigger device 10 causes the camera shutter to be released in response to phases of a lightning event and not in response to the conventional shutter releasing function, as described hereinafter in further detail.

Thus, in various alternative embodiments the lightning trigger device 10 may be physically attached to the camera 14 by other means for convenience. For example, the lightning trigger device 10 may be attached to the threaded tripod-mounting hole (not shown) on the camera 14, secured by hook and loop material such as Velcro fasteners, located remote from the camera 14. Moreover, as shown in FIG. 2, the lightning trigger device 30 may be integrated with a camera 32 in the camera housing 34 preferably in the area of the flash shoe fitting 36. As shown in FIG. 1, a fiber optic cable 38 may be coupled through the viewfinder 40 or the lens 18, not shown, to the front lens 42 of the lightning trigger device for further prescribing line of sight sensing of the lightning or flash event.

Figure 2:
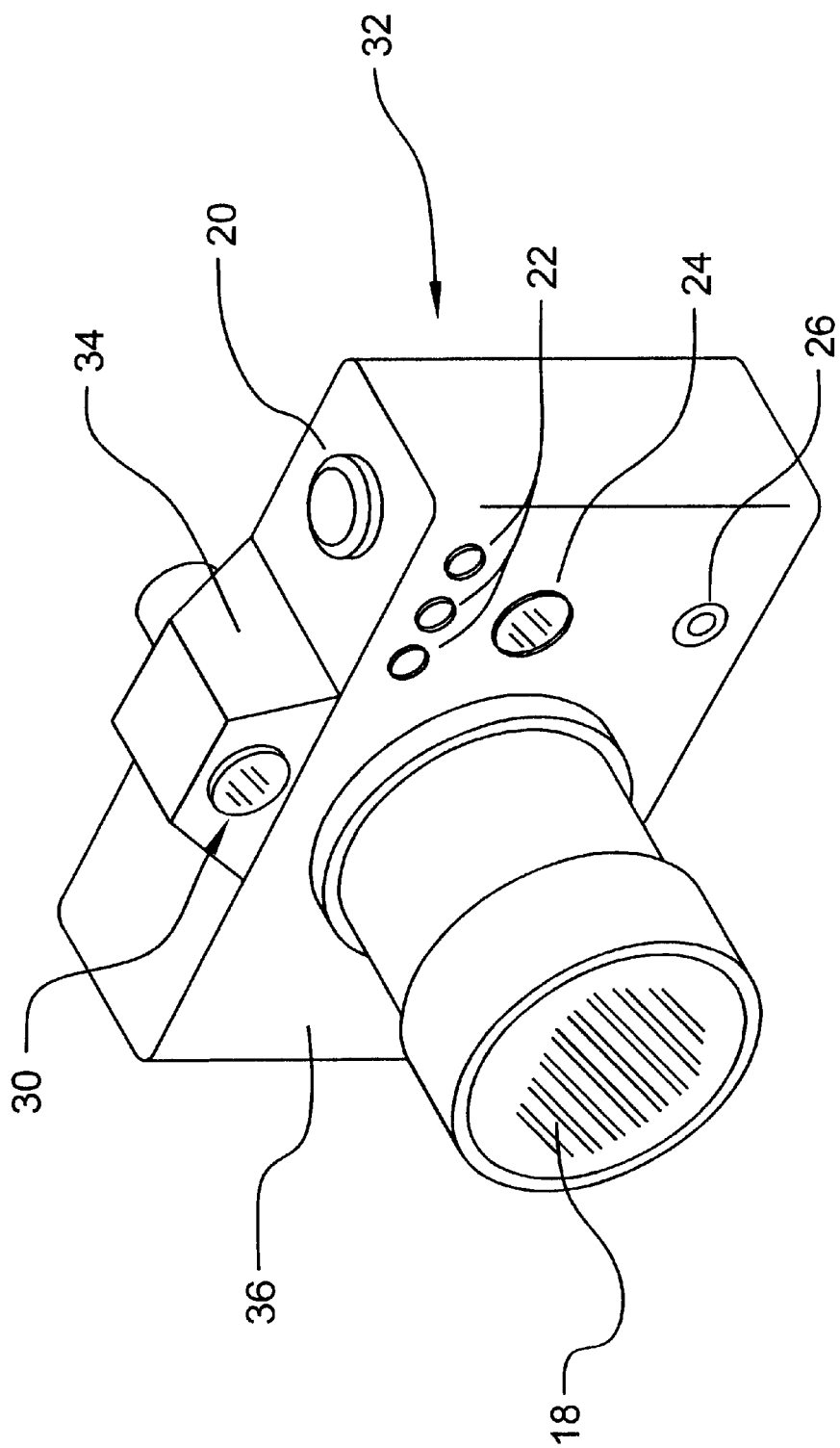
FIG. 2 is a perspective view of an alternative embodiment of the lightning trigger device shown integrated into the housing of a handheld camera.

In practical use, a lightning flash is received into the lightning trigger device 10 through the light gathering, transparent lens 42 as shown in FIG. 1. The lens 42 is either clear or colored as a filter to transmit only specific wavelengths of light. Further, a sensor hood, not shown, may also be incorporated to impart also a degree of directionality to the reception of the unregulated omni-directional flash event for the purpose of maximizing the opportunity that the camera field of view will record the lightning flash. Thereafter, the lightning flash is processed by the control circuitry contained inside the lightning trigger housing 34 or as otherwise integrated into the camera housing 36 as depicted in FIG. 2.

The circuitry and components associated with the lightning trigger device 10 are described in detail below. Referring to the embodiment shown in FIG. 3, the lightning trigger device 10 is composed of a photodiode sensor 50 including an integrated trans-impedance amplifier 52. A photodiode-trans-impedance amplifier 52 of the type known as a Burr-Brown OPT 101/210 is suitable for this purpose.

To those skilled in the art, a properly coupled discrete photodiode and amplifier can also be used. Furthermore, the amplifier can be used in various modes such as transimpedance, transconductance, summing, and differential to achieve the desired level of signal amplification.

To obtain the proper sensitivity of the sensor circuit in both high and low, i.e. day and night light levels, a secondary optical sensor is incorporated into the circuit. Such secondary optical sensor may be a photoresistor 54 coupled to the amplifier 52 for automatically adjusting the gain of the circuit by providing feedback to the output, within the limits of the device, responsive to the difference between the ambient light and the lightning event levels. The gain provided automatically by the photoresistor 54 ranges from approximately 3,000 to 5 to 20 million depending upon the light level. The gain relationship is inversely proportional to light level so that the trans-impedance amplifier 52 is never saturated in either bright or dark modes. The photoresistor 54 is particularly well adapted for this application because it has maximum resistance in the dark mode and the response time is much slower than the photodiode sensor 50. The difference in response times tends to minimize crosscoupling of the two photosensors.

The secondary feedback optical sensor may also be a properly coupled photodiode, a phototransistor, a charge coupled device, a MEMS;D-X3 image sensor, or a photosensor array device. It is also understood that fixed or adjustable resistive circuitry may be incorporated.

The primary sensors as well as the secondary feedback optical sensors are preferably selected for particular spectral response characteristics. For example, the photodiode sensor 50 may be selected for response to the primary spectral emissions of the stepped leader or return stroke. The feedback optical sensor, photoresistor 54, may be selected for broad band response characteristic of normal ambient light levels in order to facilitate optimum overall lightning flash response of the circuit.

The output from the flash detection system 48 is input to the lightning flash processing system 55. The lightning flash processing system 55 is characterized by distinguishing between the lightning event and ambient light levels and events, for lightning events such as return strokes and dart leaders. The system 55 includes a conventional alternating current (A-C) coupling circuit 56. The coupling circuit 56 passes only the current from a rapidly changing pulse produced by the photodiode sensor 50 in response to the lightning flash. The coupling circuit 56 is appropriate for detecting and photographing bulk lightning events.

The value of the A-C coupling circuit 56 defines the time constant of the circuit and is selected in order to block slower events such as those less than, several hundred hertz in frequency. This will permit blocking signals from ordinary A-C incandescent and fluorescent lighting sources that would trigger the camera shutter. Conversely, the value of the A-C coupling circuit 56 can be chosen so that slow variations in light levels such as those caused by reflected light from the motion of an object in front of the sensor is detected. To this end, a variable coupling circuit, e.g. incorporating a variable resistor is used to switch between flash and motion detection. Additional processing includes further amplification of the signal from the A-C coupling circuit 56 via a secondary amplifier 58.

The signal from the coupling circuit 56 is input into an analog comparator circuit 60. The comparator circuit 60 sets a predetermined threshold level and is set to prevent false triggering. The output signal from the comparator 60 goes high only when a sufficiently rapid flash event occur, indicative of a lightning event as opposed to ambient conditions.

The combination of these electronic components in the above described circuit yields an extremely sensitive lightning and flash event sensor over a wide range of light levels for bulk lightning events.

Figure 12A:
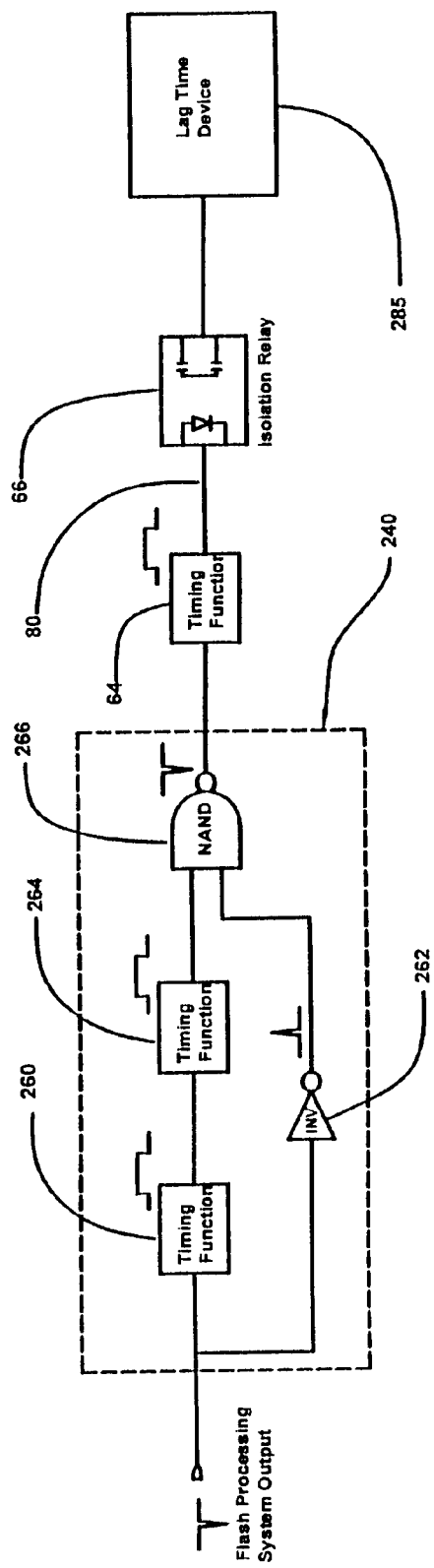
FIGS. 12a and 12b are block diagrams of further embodiments of the lightning trigger system showing the arrangement of multiple flash detection functions.

Optionally, a ground stroke detector 240 may be connected with the comparator 60 for passing only flashes with multiple impulses to a timer circuit 64. The cloud to ground flash detection mode operates on the principle of detecting the pulsating flash characteristics of the cloud to ground flash. The pulsating characteristics include the preliminary breakdown phase, the stepped leader, the dart leader on the return stroke and rapid pulsing flash sources. The cloud to ground detection mode utilizes the detection of a single flash pulse to enable the circuit for a subsequent impulse within a prescribed time period to trigger the timer 64. Those skilled in the art of lightning photograph will appreciate that cloud to ground flashes are the most desirable, and by avoiding the numerous daytime intracloud flashes copious quantities of film may be saved An embodiment of the multiple flash or ground stroke 240 detection circuit is shown in FIG. 12a. Multiple lightning flash impulse periods characteristic of the preliminary breakdown, stepped leader, dart leader and return stroke having said characteristic flash frequency periods are output from flash processing system 55 as previously described into said multiple flash detection circuit. The initial or primary impulse from the aforementioned flash is simultaneously input into timing function 260 and signal inverter 262. Timing function 260 is established wherein said function duration is less than the selected multiple flash impulse period and ending prior to occurrence of a secondary impulse. Completion of the timing period initiates timing function 264. Timing function 264 is established wherein completion of the timing period occurs prior to the subsequent or tertiary impulse. The sequence of timing functions 260 and 264 provide a window wherein activation of the detection circuit is completed only when the impulse frequency period is within the window period. Completion of the timing function 264 is input into NAND function 266 simultaneously and in parallel with the output of the signal inverter 262. Output of the NAND function initiates timing function 64 and resultant activation of the relay 66. The multiple flash detection means provides for activation of the relay 66 only when multiple flashes occur within the specified impulse period frequencies.

To further improve the ability for the camera to capture the lightning flash due to inherent shutter lag time, the camera shutter may be activated upon detection the first impulse via time 64 and relay 66. The camera shutter is allowed to open only if a second flash impulse is detected prior to completion of the shutter lag time period. If a second flash impulse is not detected within the aforementioned period, the timer 64 is reset thereby causing relay 64 to open and allow the camera shutter to be reset and hence the camera shutter is not allowed to open.

Figure 12B:
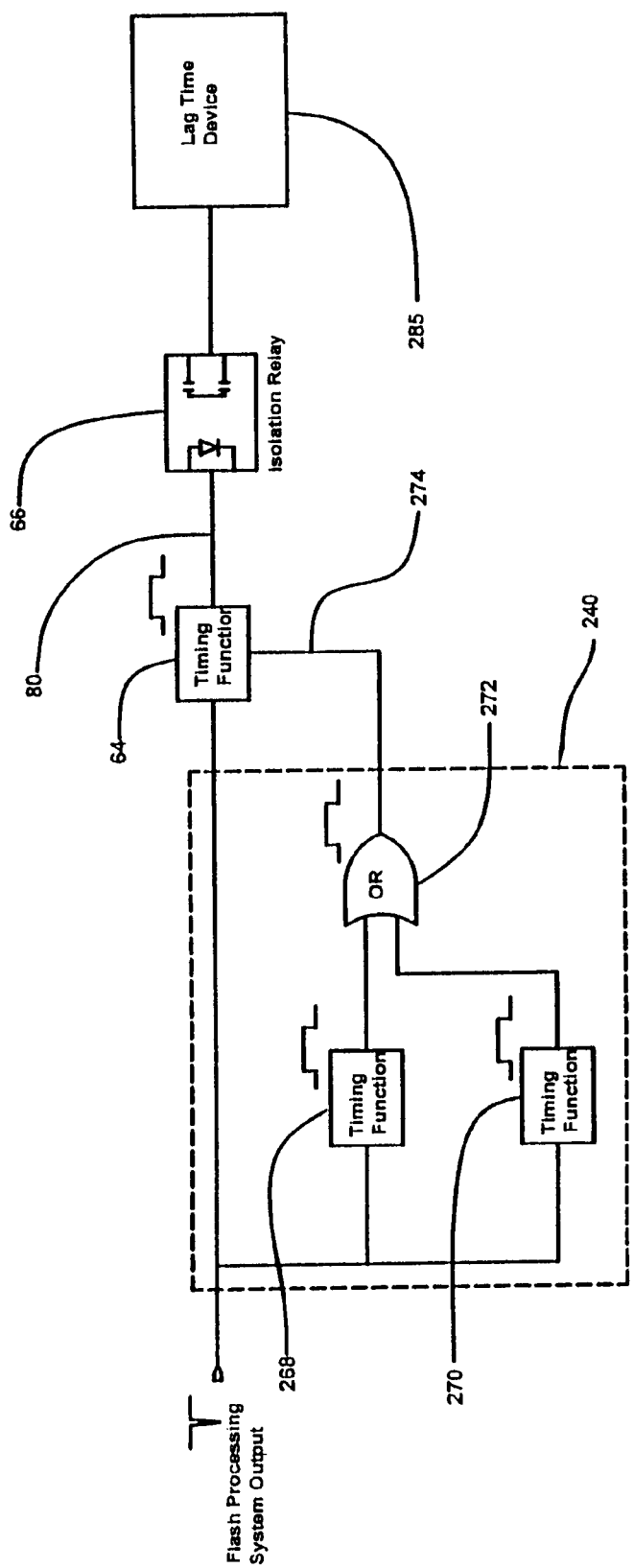

An embodiment of the multiple flash or ground stroke detection circuit 240 incorporating timing function reset is shown in FIG. 12b. Of particular interest is the activation of devices wherein the lag times of the devices are relatively long in relation to the event being detected and wherein the multiple flash detection is accomplished prior to the device lag time completion.

Multiple lightning flash impulse periods characteristic of the preliminary breakdown, stepped leader, dart leader, return stroke and specified flashes have the characteristic flash frequency periods are output from the flash processing system 55 as previously described. The initial or primary impulse is simultaneously input into timing functions 268, 270 and 64 causing the timing function 64 to activate the relay 66. Output from the timing functions 268 and 270 are simultaneously input into OR function 272 and are selected wherein a subsequent impulse signal is required prior to completion of the timing function 268 for maintained activation of the OR function. Additionally, the duration the timing function 268 is less than the lag time of the device and will cause a reset of the timing function unless a secondary impulse is input prior to completion of the timing function 64. Furthermore, the subsequent impulse signal is required to possess an impulse period greater than the duration of the timing function 270 to cause repeated activation of the OR function. Activation of the OR function during the timing function period 64 and prior to completion of the timing function 268 prevents activation of the reset input function 274 allowing the timing function to be completed therein causing the relay 66 to activate the lag time device.

The aforementioned multiple flash or ground stroke detection circuits may be extended in operation to provide for detection of any number of flashes, which occur before activation of the relay 66. Application of the inverting logic functions are chosen as determined necessary by the appropriate selection of signal rise or fall triggered timing and reset functions. The above described timing and logic functions may be performed by analog or digital means to provide impulse filtering functions and to ensure multiple impulse flashes having specified characteristics are detected.

Furthermore, additional specified impulse frequency periods such as those transmitted and not naturally occurring may be selected using the aforementioned multiple impulse detection means. It is well known by those skilled in the art that additional filtering techniques are available including such as those previously described and may be utilized for the purposes of impulse period detection.

Output from the comparator circuit 60 is input to a control system 62. The control system includes a timer circuit 64 that is utilized to hold the output high for a time sufficient to insure that a desired control activity, such as camera shutter release, will occur. For photographic purposes, a nominal one-second duration is utilized. The duration for other activities will vary with the requirements of the auxiliary components. For example, when utilizing the aforementioned fiber optic cable 38 for remote sensing through the camera lens 18 as shown in FIG. 1, the holding time of timer circuit 64 is increased to ensure that the camera mirror (not shown) return does not cause the feedback effect of a light flash and cause comparator circuit 60 to false trigger causing the camera shutter to be released repetitively. The nominal holding time duration of timer circuit in this embodiment should be equal to the shutter speed plus one-second.

Output from the timer circuit 64 is directed to an isolation relay 66 and/or an infrared camera release 68 depending upon the particular method the camera requires. The isolation relay 66 and the camera release serve as dry switches for the camera 20.

To further reduce the shutter lag time when utilizing the infrared camera release, which imposes an additional delay due the coded pulse generation, single and simultaneous multiple channel and emitter frequencies may be used to activate the metering system and shutter release. The coded pulse transmitter and receiver may also utilize UV, optical and RF frequencies to minimize the coded pulse generation period. Utilizing the aforementioned method, the coded pulse period, which typically lasts from twenty to one hundred milliseconds can be reduced to less than three milliseconds.

Figure 4:
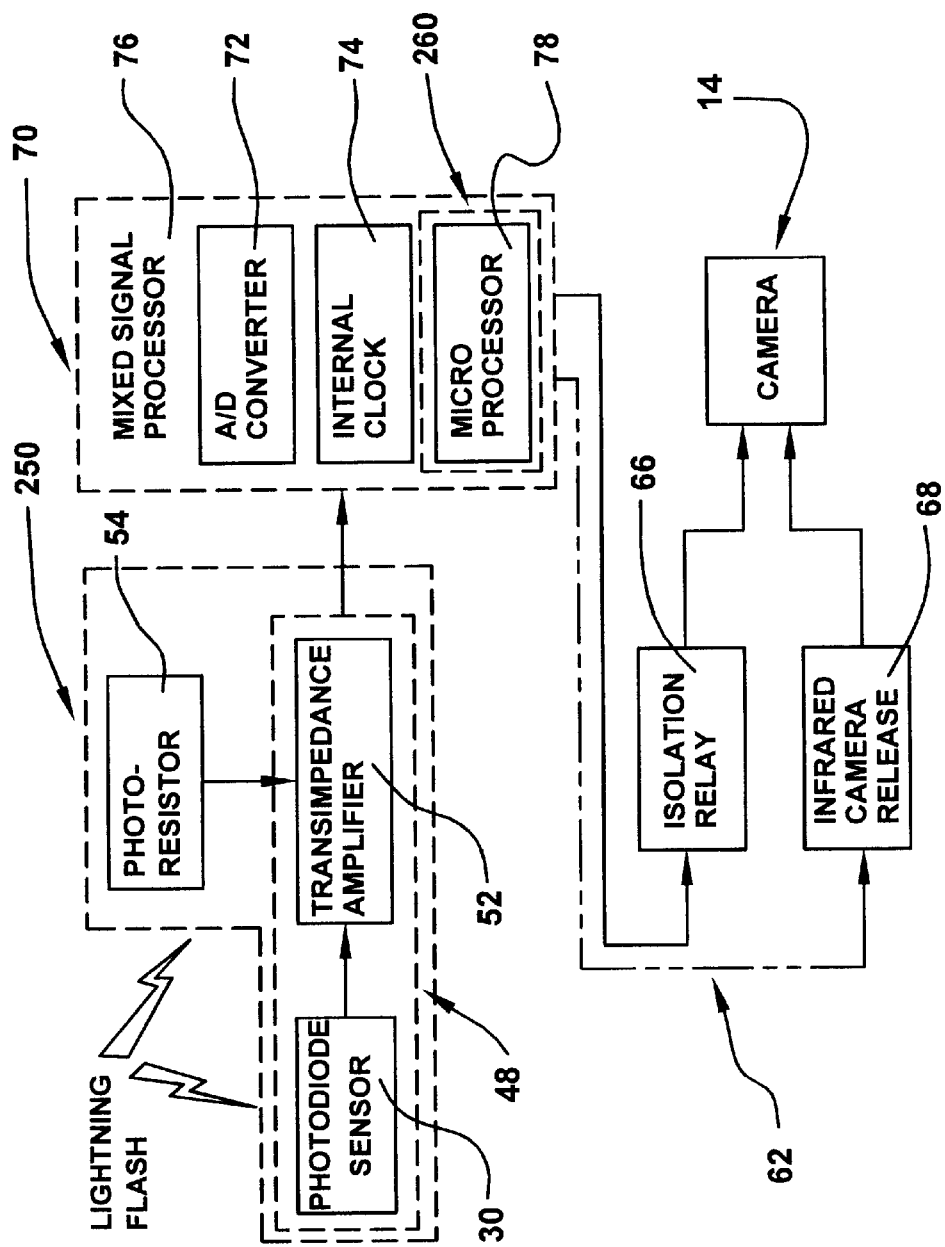
FIG. 4 is an alternative embodiment of the lightning trigger system showing the arrangement of the components thereof.

Referring now to FIG. 4, there is shown therein an alternative analog/digital embodiment of the lightning trigger device 10. In this embodiment the functions of the comparator circuit, and the timer circuit are included on a programmable logic device 70 with and analog/digital converter 72, and real time clock 74. A mixed signal processor 76 such as the Texas Instruments MSP430 mixed signal processor into which the lightning event processing functions can be incorporated into program code is suitable for this purpose.

In this embodiment of the circuit, a microprocessor 78 receives the digital output of the onboard analog/digital converter 72 after converting the voltage change from the sensor system 48 in response to the lightning flash.

After a flash event has been recognized as a change in light level within a prescribed time period or other criteria for response based on the lightning event selected for processing, the output is input to the isolation relay 66, which functions as a dry switch and closes. The coded pulse is also output to an infrared camera release 68, which alternatively causes the camera shutter to release. Again, the method used is dependent upon requirements of the particular camera. Programming may also be used to distinguish slower flash events of less than several hundred hertz, such as incandescent or fluorescent lighting and/or flash events characteristic of the stepped leader or motion events as described above.

The digital capability of the mixed signal processor 76 further provides for additional functions to be incorporated into this embodiment. Such functions may include recording lightning spectral and flash sequence data to be collected for subsequent down loading and analysis. To accomplish this non-volatile RAM is incorporated for storage of the intensity of the flash event.

The mixed signal processor (MSP430) 34 allows for up to four photodiode/trans-impedance amplifier sensors to be utilized. Each of the four amplifiers may incorporate spectral filters to allow detection of specific wavelengths of light in the 300 nm to 1100 nm range, i.e. ultraviolet, visible, and infrared portions of the spectrum.

Each of such four photodiode sensor outputs is calibrated to provide equivalent responses at their prescribed spectral ranges and may each be interpreted on an absolute or relative basis. The clock speed of the microprocessor, i.e. the MSP 430 at 4 MHz provides for ample sampling rates to characterize a lightning flash with stroke events of one millisecond duration. A higher clock speed and therefore more powerful mixed signal processor may also be used to achieve sampling rates necessary to adequately detect the frequencies characteristic of the stepped leader.

A further extension of the analog/digital embodiment of the lightning trigger device may include using additional channels of the mixed signal processor 76 to actuate additional isolation relays for triggering multiple cameras for specific spectral sensitive films. A high-speed video camera (not shown) may also be triggered that would allow correlation of the spectral signature and individual strokes of the lightning flash. An electric field sensor (not shown) may also be incorporated on an input to provide increased field sensing capability that may indicate an incipient lightning discharge thereby alerting the user of possible danger.

Figure 5A:
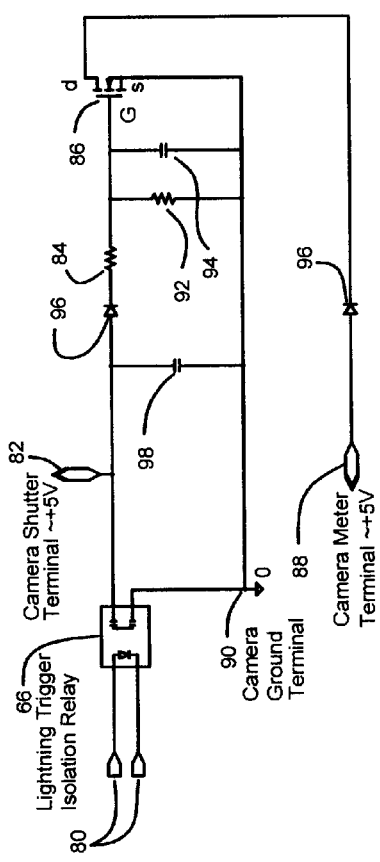
FIGS. 5a through 5d are diagrams of photographic lightning trigger circuitry for independently pre-activating the camera metering system.

Referring now to FIG. 5a, there is shown an electronic circuit for reducing the shutter lag time of a camera sufficiently to ensure complete shutter opening within the time frame of the target lightning event. Depending on the particular camera, the shutter lag time may be reduced as much as 185 milliseconds by pre-activating the metering system and thus enabling a greater opportunity for more return strokes to be captured on film.

To this end, the normally open isolation relay is activated via inputs 80 from the timer circuit of the foregoing embodiments. The voltage from the camera shutter release terminal 82 is applied through resistor 84 to the base of a FET 86. The value of resistor 84 is selected to minimize current leakage through the FET 86 and prevent activation of the shutter until isolation relay 66 is activated. The applied voltage to the base of FET 86 enables the voltage from camera meter terminal 88 to be shorted at camera ground terminal 90, thus activating the camera metering system, not shown.

The resistor 92 and capacitor 94 form an R-C circuit that continuously enables the FET 86 and thereby the camera metering system for approximately 60 milliseconds after the isolation relay is activated. Resultantly, the camera shutter release terminal 82 is shorted to the camera ground terminal 90. This continuous enabling of the metering system ensures that the exposure information is available throughout the shutter lag time period. Once the isolation relay 66 is deactivated after completing the timing function, the camera metering system is electrically reset via the camera's internal circuitry and the metering function is thereby reset.

Diodes 96 are employed to prevent any feedback currents into the camera circuitry and prevent possible damage thereto. Capacitor 94 is utilized to stabilize the described metering activation circuitry.

Figure 5B:
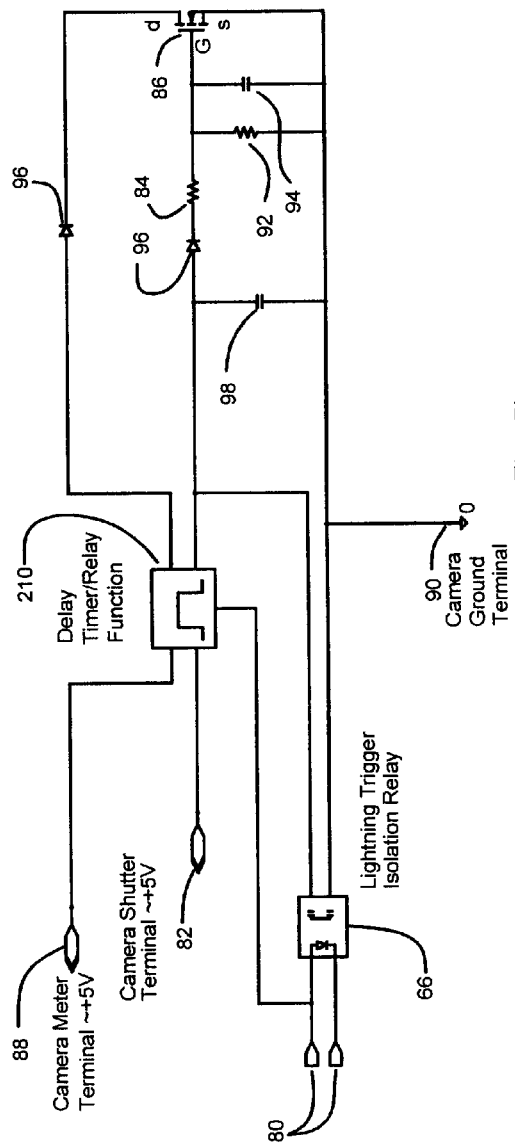
Figure 5C:
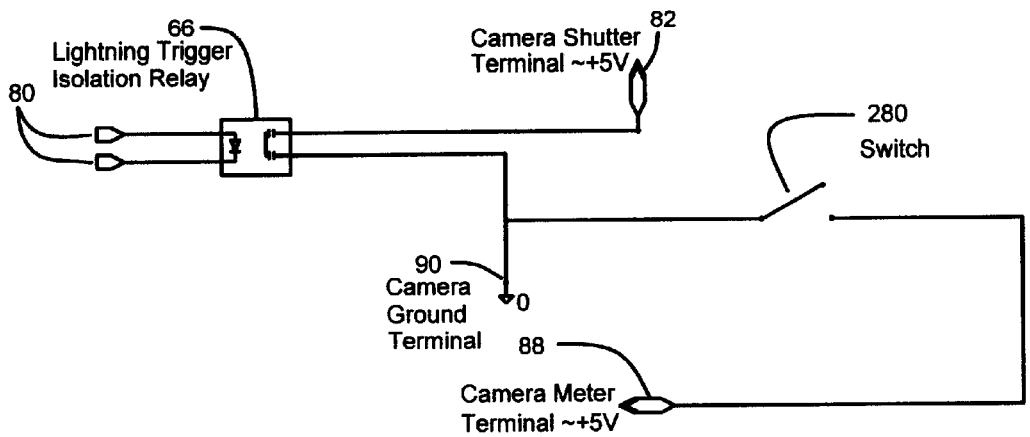

Alternatively and as shown in FIG. 5b, a timing function 210 is electrically connected with the relay 66 in the circuit of FIG. 5a to provide for a delay period between shutter activation and actual shutter release. The delay period provides for camera functions to be executed while providing for timely shutter release to capture the flash event. Furthermore, the timing function 210 provides an interrupt period wherein the shutter voltage does not enable the metering period after shutter release thereby allowing an external electrically isolated reset of the camera metering and shutter system. Cameras such as the Olympus E-10 benefit from the delay period for performing the pre-shutter release functions Alternatively as shown in FIG. 5c, some cameras such as the Nikon N90 do not require an external reset of the metering function. For such cameras activation of the metering system is achieved through switching means 280 and activation of the shutter release is performed as previously described.

Figure 5D:
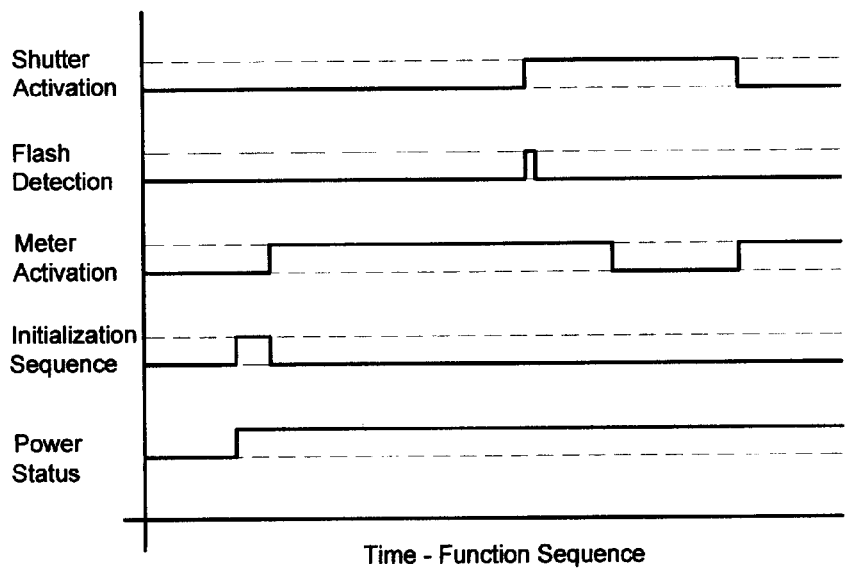

Referring to FIG. 5d wherein the sequence shown is of circuit functions as described in FIGS. 5a, 5b, and 5c, some digital camera require logic functions to perform the shutter lag time reduction wherein the sequence is performed by digital code. Additionally, connectivity and/communication protocols, e.g. "handshake may be provided so that proper initialization of the camera, metering and image acquisition may be achieved. The protocols may include delayed and/or resetting functions. The digital or logic functions may be performed by microprocessor, discrete logic, programmable logic, or application specific devices.

The shutter lag time reducing circuits can be used with standard film, digital cameras, including video cameras. Additionally, the circuits can be extended to provide synchronization of multiple cameras using multiple shutter lag time reducing circuits, wherein the camera's electrical circuits are isolated as previously described. Furthermore, the shutter lag time reducing circuits can be used to provide activation of devices wherein the lag time and synchronization is of significance to the operation being performed.

Figure 3:
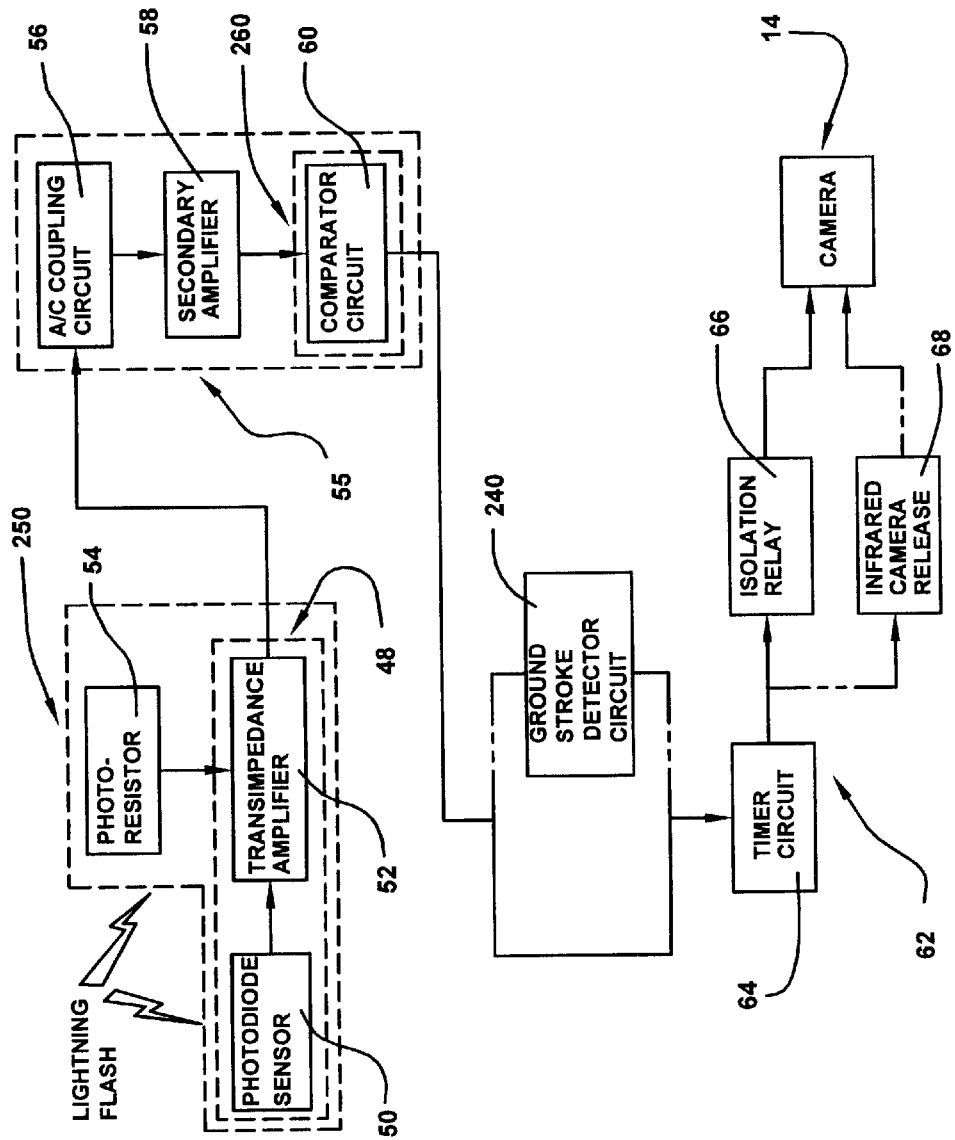
FIG. 3 is a block diagram of the preferred embodiment of the lightning trigger system showing the arrangement of the components thereof.
Figure 6:
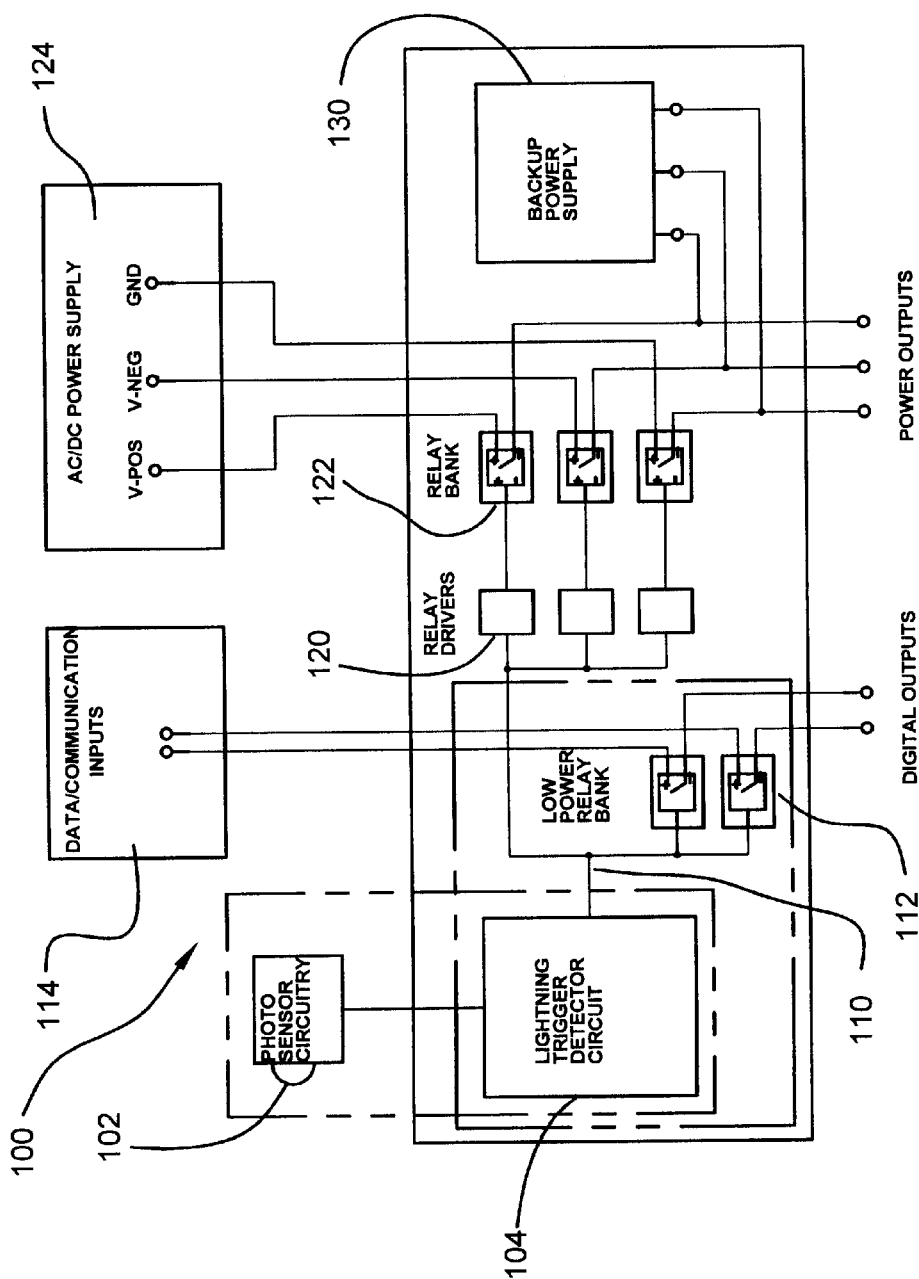
FIG. 6 is a block diagram of an alternative embodiment of the lightning trigger system showing the arrangement of the stepped leader detection and electrical protection system.

Referring to FIG. 6 there is shown an alternative embodiment of the lightning trigger-detection device for protecting auxiliary devices, such electronic and electrical devices, from the destructive effects of the lightning return stroke by detecting preemptively the initiation of the stepped leader. Therein, the lightning trigger device 100 includes the photosensor detection system 102 described above, the output of which is input to detector circuit 104. The detector circuit uses a tuned band pass filtering system to distinguish the characteristics of the stepped leader from the characteristics of the return stroke. The filtering system, as described in greater detail below passes only the current in a frequency range provided by bandwidth of the photodiode sensor 50. For example the filtering system may include a first band pass filter and a second band pass filter to detect different stepped leader characteristics, such as the aforementioned rise time and impulse periods. The luminous ranges of the stepped leader and the corresponding band pass filters of interest are the rise time frequencies of approximately 500 to 2,500 kHz and representative impulse center frequency of 20 kHz, which may range from approximately 16 kHz to 50 kHz. The band pass filtering system may also incorporate frequency recognition circuitry to further ensure that the detected optical frequencies are coincident and are in the range characteristic of the stepped leader. The frequency recognition circuitry may also incorporate mathematical methods such as Fourier Transform analysis or simple coincidence techniques to ensure the occurrence of the stepped leader event More particularly, the lightning trigger-detector circuit 104, preferably the embodiment in principal shown in FIG. 3 is connected with the photo sensor circuitry 102 comprised of components: lens 42, enclosure 34, photodiode 50, transimpedance amplifier 52 and photoresistor 54. The sensor circuitry is remotely mounted for convenience and compactness in a window or other manner to enable viewing of the lightning flash. By appropriate connections the detector circuit may be located convenient to the location of the electronic or electrical devices being protected. The highly sensitive circuitry of the preferred embodiment enables detection of the stepped leader at a distance exceeding five miles regardless of the orientation of the sensor due to the atmospheric scattering of the light. The detector and sensor components may be comparable to the above embodiments upstream of the isolation relay and/or like control systems for the camera application.

The output 110 from the detector circuit 104 is connected isolation relays 112 controlling data communication inputs 114, such as data or communication sources, having low power requirements. The output 110 is also input to solenoid relay driver(s) 120 controlling a relay bank of isolation relays 122, selected on the basis of high output-input isolation voltages, high breakdown voltages and rapid release times for protection of higher power requirement auxiliary devices at AC/DC power supply 124.

For instance, applications protecting electronic and electrical devices which operate on greater than one-ampere, reed relays such as those known as ERG Components HVK1 form A/B may be used to provide 17,000 volts isolation at one-millisecond release time. Solid state relays may also be utilized where breakdown voltage and response are suitable for the application, such as those known as Behkle HTS Series. In general, for return stroke and EMP isolation, the relays or circuit completion-interruption devices should have specifications of less than one-millisecond release times, high output-input isolation voltages and breakdown voltages of greater than 6,000 volts in open circuit state.

Typically, more than one power, data or communication source transmission line is required. Isolation relay(s) 112 and 122 may be provided for each line that may conduct the damaging return stroke surge and EMP to the electronic or electrical device. For example, it is common to have positive, neutral and ground conductors for a single-phase AC power supply. In this application, three isolation relays 12 would be provided for protection of the electronic or electrical devices.

A backup power supply 130 may also be incorporated to ensure that as isolation relay(s) 112 and/or 122 are disconnected from the power, data or communications source that the electronic or electrical device can remain in continuous operation until the return stroke surge and EMP are dissipated. A nominal duration of five seconds may be used for the timer circuit to maintain the isolation relays. However, for some applications it may be desirable to switch to non-conductive state during return strokes and to conductive state between return strokes, etc. Such an application might be suitable for critical digital data transmission. After the said nominal period of open circuit state of isolation relays, the backup power supply will resume the normal operational mode.

Figure 7:
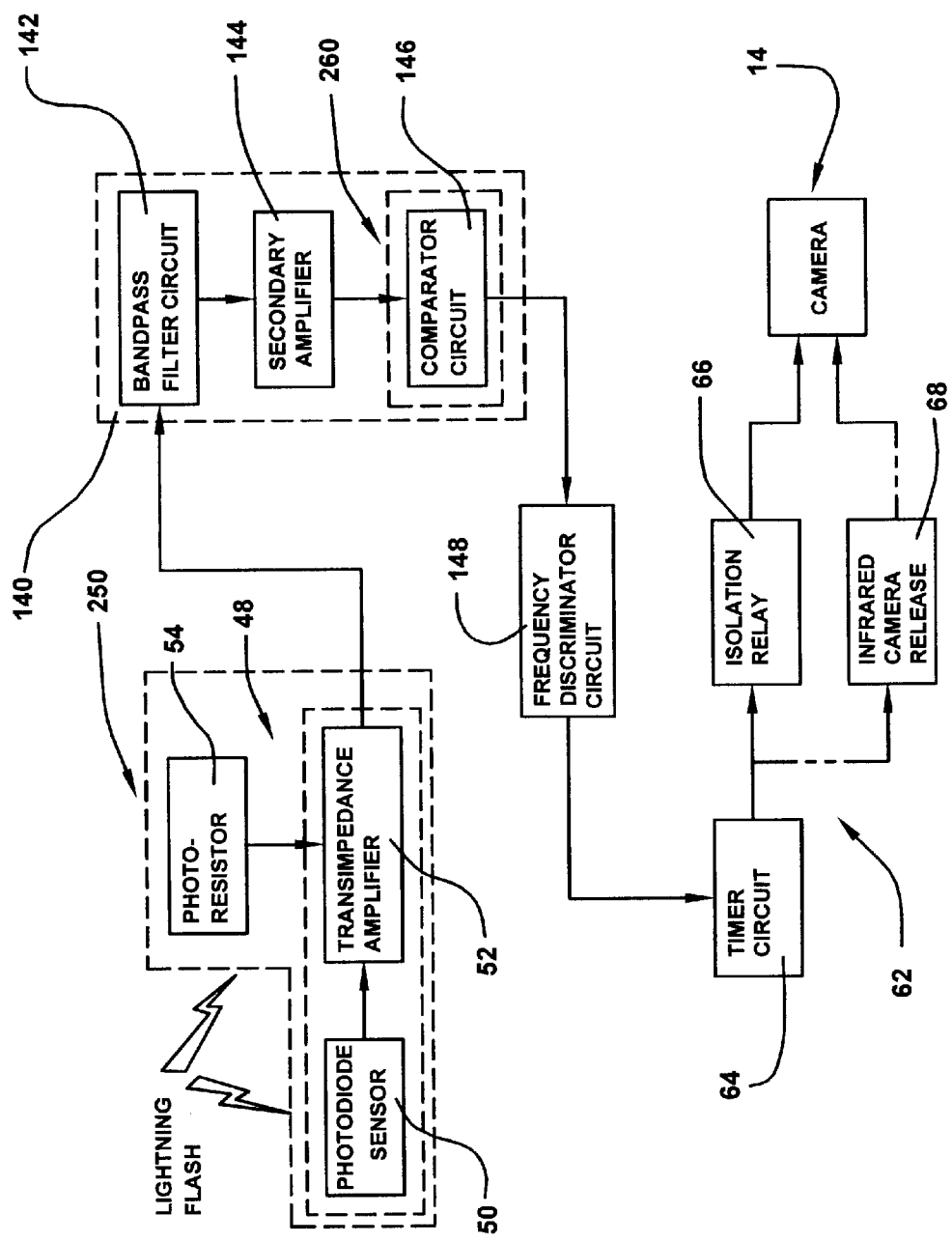
FIG. 7 is a block diagram of another embodiment of the invention.

For control applications wherein the preemptive ability to detect the stepped leader event to protect against adverse consequences attendant to the return stroke, as previously mentioned, it is desirable to detect multiple unique characteristics of the stepped leader event. One such embodiment is illustrated in FIG. 7, wherein the above described detector system 48 including photodiode 50, amplifier 52 and photoresistor 54 is output to the signal processing system 140. Therein the processing system 140 includes filter circuit 142 for distinguishing ambient conditions. The filter circuit 142 is input to secondary amplifier 144 and to comparator circuit 146, the later of which are comparable to the previously described embodiments. The output from the processing system 140 is input to a frequency discriminator circuit 148. For the stepped leader event, the discriminator circuit may pass the periodic characteristic, i.e. 20 kHz center band within a range of 8 to 50 kHz, or the rise time characteristic of 1 MHz within a range of 300 kHz to 3 MHz. Accordingly output satisfying such discrimination is input to the control system 62 including the timer circuit 64, the isolation relay 66 and the infrared camera release 68. The output from the control system is operative at the camera 14, with or without the metering bypass function, to ensure full shutter opening prior to the lightning return stroke.

Referring to FIG. 8, there are illustrated embodiments of the processing function for interfacing the detection system 48 with the control system 62. FIG. 8a illustrates an embodiment for various lightning events as described with reference to FIG. 7.

Referring to FIG. 8b, there is illustrated a processing 150 for preemptive use comprising a characteristic rise time bandpass filter 152, 1 MHz center band, in parallel with a characteristic periodic bandpass filter 154, 20 kHz center band. The output of filters 152, 154 is input to buffers 156 effective for providing isolation of the respective outputs. The output of buffers 156 is input serially to the secondary amplifier 58 and comparator circuit 60 as described above. The output of the comparator circuit 60 is input to a coincidence detector 158 having a sample hold function. The detector 158 holds the rise time signal until the periodic signal and thereafter determines output to the control system 62.

Referring to FIG. 8c, a further control system 160 includes a rise time, 1 MHz center band filter 162 that is input to signal conditioner 164. The signal conditioner 164 shapes the signal to reduce transients and passes signals only above a certain level, thereby eliminating extraneous influences such as environment conditions. The output of the signal conditioner 164 is serially input to the secondary amplifier 58 and comparator circuit 60 as described above. The output from the comparator circuit 60 is input to pulse period discriminator 166. The discriminator 166 is triggered in response to the first rise time signal and thereafter uses a lower window 167 and upper window 168 to determine if the succeeding impulse is within the time frame characteristic of the stepped leader event. Upon compliance the signal is input to the control system 62.

Referring to FIG. 8d, a processing system 170 includes a rise time band pass filter 172, signal conditioner 174, secondary amplifier 58 and comparator circuit 60 as described above. The output from the comparator circuit 60 is input to a frequency comparator 176 and frequency band detector 178. Both circuits determine if input frequencies are within a characteristic range. The comparator 176 uses multiple comparators. The detector 178 uses flip-flop devices.

Further definition of the optical characteristics for the sensors may be accomplished as shown in FIG. 9. Therein the photodiode sensor 50 is provided with a spectral filter 200 for screening non-lightning frequencies outside the spectral lightning range. The photoresistor 54 is provided with a spectral filter 202 for screening frequencies outside the range of ambient conditions. Furthermore, the filter 200 may also be curved as in a lens to provide a limited angle of view therein excluding detection of unwanted peripheral lightning flashes incident upon the photodiode. Additionally, the filter 202 may also be curved as in a lens and diffuse therein providing an averaging effect of the ambient light incident on the photoresistor. Of course, such discrimination may also be directly incorporated into commercially available sensors as in a covering lens, or as in the case of a diffraction-microelectromechanical system (D-MEMS) sensor may be wavelength responsive to the desired lightning characteristics.

The hereinabove described alternative embodiment may be extended to provide protection for any wired and/or wireless means of communication, digital and/or analog (RF), AC/DC power transmission for any electronic or electrical device requiring protection from lighting return stroke and EMP surges within the time period of the same lightning flash.

From the above it can be seen that the photographic lightning trigger-detection device of the present invention provides the user with a practical method and apparatus for photographing lightning strikes.

The present lightning trigger device is capable of interfacing with many commercially available cameras that have sufficiently fast shutter lag times and is adaptable to function with the camera's remote electronic shutter release or the infrared shutter release.

The inherent portability of the lightweight, compact device allows the user to safely obtain lightning photographs using a hand-held camera while inside a car, house, or protective structure.

Furthermore, from the above it can be seen that the lightning trigger-flash detection device of the present invention provides the user with a practical method and apparatus for the protection of electronic and electrical devices from the damaging effects of lightning strikes by detection of the initiation of the stepped leader and isolating the said devices from the damaging effects of the return strokes within the time period of the same lightning flash.

Furthermore, from the above it can be seen that the lightning trigger-flash detection device provides the user with a practical method and apparatus to detect rapid light or muzzle flashes for the activation of alert and controlling associated equipment.

It is well known by those skilled in the art that signal amplification is not only limited to transimpedance and linear amplification, but also may include other amplification techniques. The present invention has determined that an essential advantage for low contrast flash event detection is the utilization of non-linear amplification. This provides a distinct advantage in that an output signal may be obtained which has substantially constant sensitivity to varying ambient light and electromagnetic noise levels, while providing for greatly intensified amplification of the flash pulse. Such capability is particularly useful in daytime flash event detection, e.g. where sunlight intensity or cloud formation is varying the ambient conditions or where RF noise is occurring. Further, the output function may be selected to provide distance/intensity based sensitivity to flash events by taking advantage of the inverse-square relationship exhibited by light intensity fall-off as a function of distance from the source. Therein, the response characteristics of the lightning trigger device are selected to ignore flashes occurring beyond a selectable detection distance or intensity level. Moreover, the method may be employed with appropriated non-linear gain feedback devices to obtain the desired non-linear amplification output response.

In one embodiment a photosensor for feedback gain is one example of an external device for providing non-linear amplification. Another embodiment employs non-linear pulse amplification using non-sensor devices such as logarithmic amplifiers.

Figure 10A:
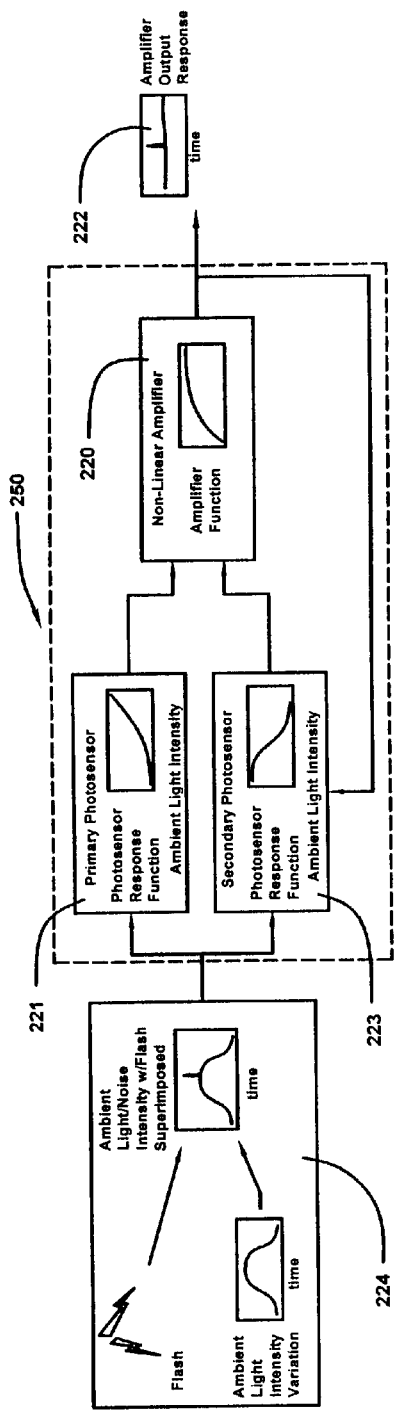

Referring to FIG. 10a, a primary photosensor 221 of prescribed response and a secondary gain adjusting photosensor 223 are electrically connected in parallel to a non-linear amplifier 220 having a differing prescribed response function with a feedback to the secondary gain adjusting photosensor. The resultant signal amplification 222 is obtained demonstrating a substantially constant output response to ambient light and electromagnetic noise levels, while providing a greatly intensified and discernible amplification of the flash pulse.

Figure 10B:
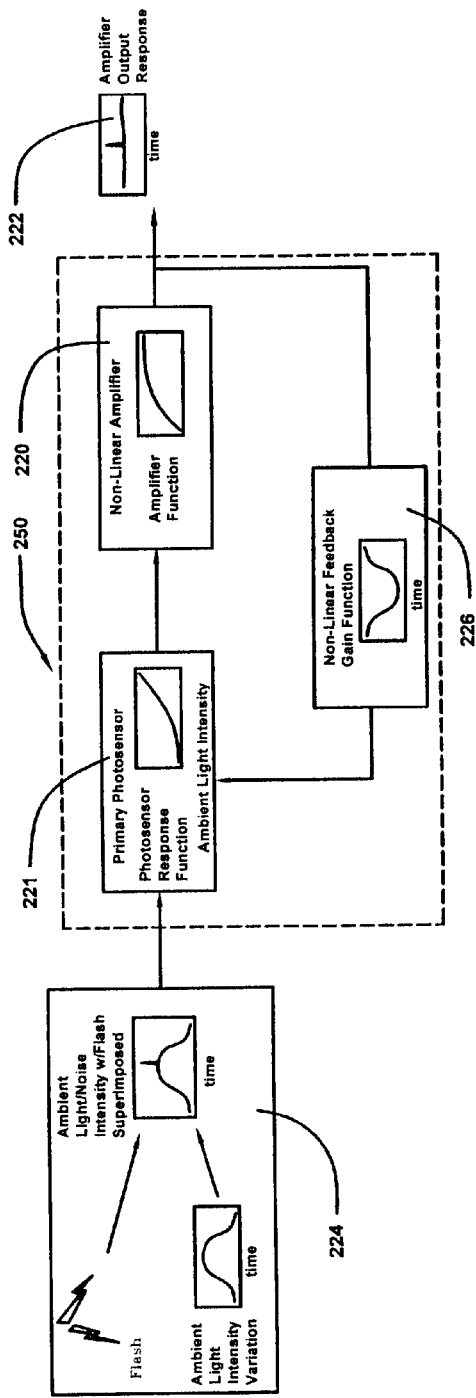

A further embodiment is illustrated in FIG. 10b wherein the secondary photosensor 223 with a non-photosensor gain function circuit 226 providing a resultant signal amplification 222 as described above.

Another embodiment is illustrated in FIG. 10c wherein a filtering averaging function 225 is connected to circuit 226 and photosensor 223 whereby gain feedback into the non-linear amplifier 220 is not effected by the flash event, whereas the ambient light and electromagnetic noise levels 224 are input and said non-linear amplifier output response 222 is substantially constant while providing for greatly intensified amplification of the flash pulse.

Yet another embodiment is illustrated in FIG. 10d wherein the amplifier 220 is configured to provide and non-linear output response and the amplification function is selected to produce a substantially constant sensitivity to ambient light and noise levels, while providing for greatly intensified amplification of the flash pulse.

Figure 10E:
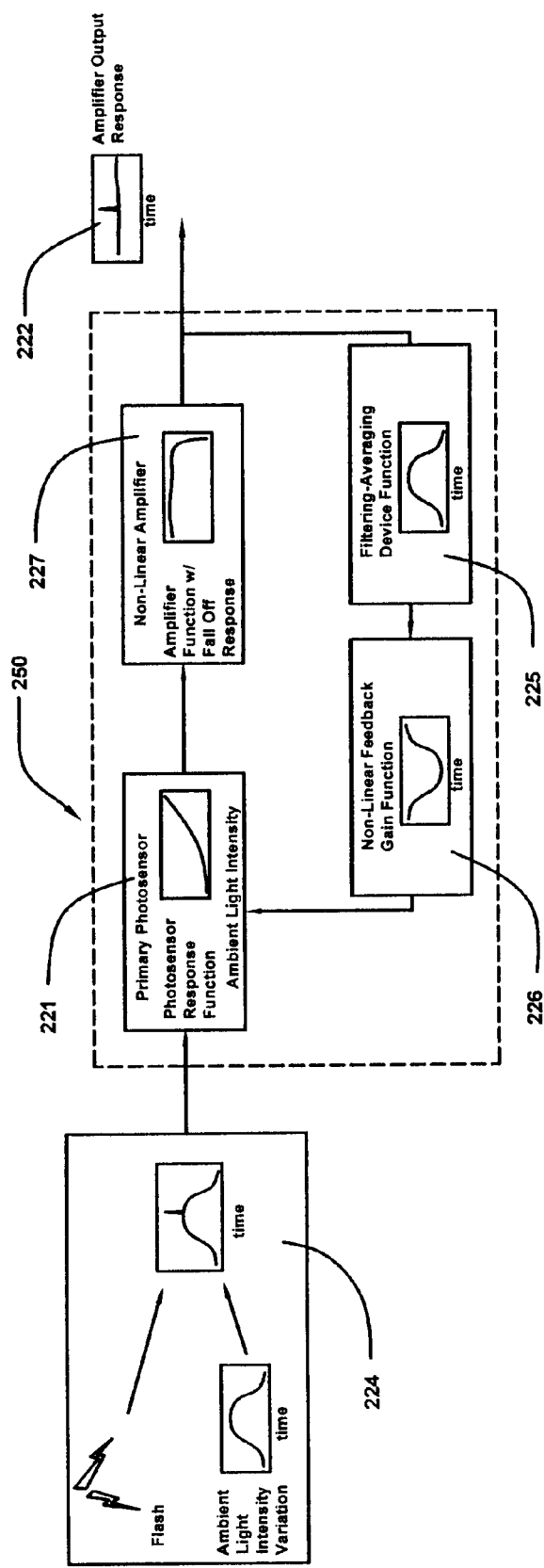

Another embodiment is illustrated in FIG. 10e wherein a non-linear amplifier 227 with fall off response as illustrated is configured to provide nonlinear output signal, wherein the amplification function is selected to produce a substantially constant sensitivity to ambient light and noise levels, and to provide the aforementioned distance/intensity limited sensitivity to flash events.

Another embodiment is illustrated in FIG. 9 wherein the filters 200 and 202 are autodarkening and therein alter the light levels input to the photosensors as a function of ambient intensity, therein providing non-linear amplification by maintaining substantially constant ambient light and noise levels incident upon the sensors.

Typical comparator applications utilize a threshold level established through biasing one of the comparator or linear operational amplifier inputs. Therein, the output of the device is dependent upon a preset input level condition and is maintained at a prescribed level until an input signal is received at a level different than the preset threshold level to cause a resultant change in the output.

The present invention also provides a variable threshold event comparator function that provides an output signal, which is not dependent upon a preset input level condition and remains unchanged until a sufficiently rapid change in input level or an impulse occurs. The input levels can then be substantially equal and slowly change without affecting the output of the comparator thereby enhancing the sensitivity of the comparator function.

Figure 11A:
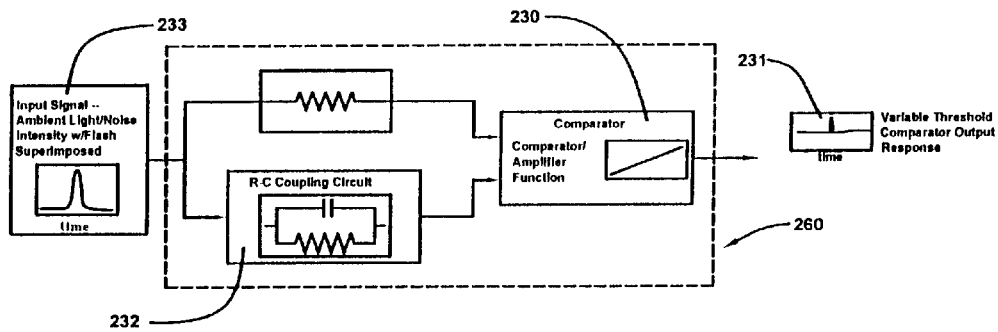
FIGS. 11a through 11c are block diagrams of further embodiments of the lightning trigger system showing the arrangement of the variable threshold comparator functions.

One such embodiment is shown in FIG. 11a wherein a variable threshold event comparator 231 is provided by a parallel R-C coupling 232 electrically connected to a comparator 230. The input signal 233 is electrically connected in parallel to the comparator and R-C coupling 232. The resultant output response 231 maintains a constant output level until a rapid change in the input occurs, at which time the output level changes. The rate of change in input level required to cause the output to change is determined by the R-C time constant and is selected to correspond to the rise/fall time of the flash being detected.

Figure 11B:
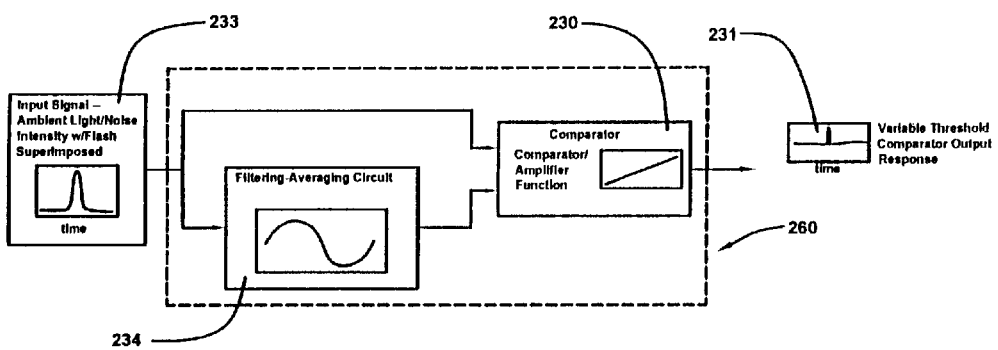

Another embodiment is shown in FIG. 11b wherein the comparator function comprises a filter averager 234, such as a sample-hold circuit or a finite-impulse-response (FIR) filter, to provide the advantage of enhanced sensitivity.

Figure 11C:
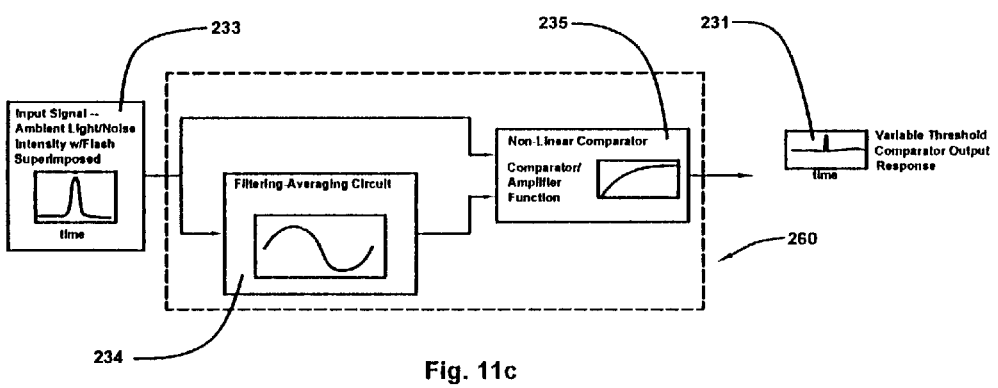

A further embodiment is shown in FIG. 11c wherein the comparator comprises a non-linear comparator or amplifier 235 to provide the enhanced impulse sensitivity.

Figure 13A:
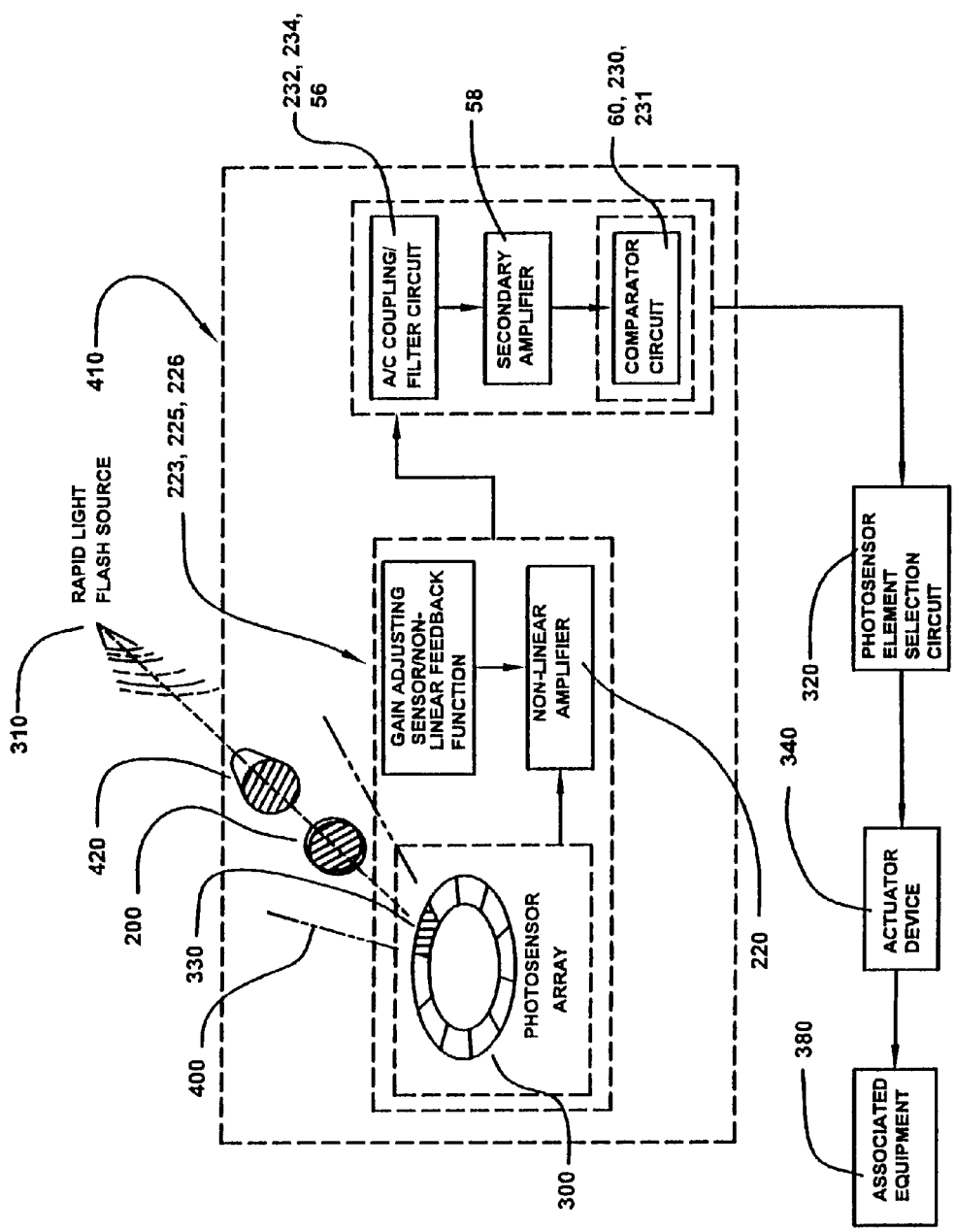
FIGS. 13d and 13b are block diagrams of further embodiments of the lightning trigger-flash detection system showing the arrangement of the actuation of associated equipment.

Referring now to FIG. 13a, there is shown an alternative embodiment of the lightning-flash detection device. In this embodiment, a photosensor array 300 is shown for the detection and location of a rapid pulse flash source 310. The flash event spectral characteristics of interest in this embodiment include deep UV through far IR. Emission of said flash is incident upon corresponding photosensor element 330, which is substantially within the line of sight and wherein said photosenor element having a prescribed angle of resolution 400. The resolution of said photosensor array being further defined by the number of elements. The address code indicating position, orientation and time of occurrence of said element is assigned. Output signal of photosensor element 330 is input into non-linear amplifier 220 as referenced in FIGS. 10a–e and wherein the said signal is amplified according to the prescribed non-linear gain function 223, 225, and 226. The output of the non-linear amplifier being substantially constant based upon ambient and flash event levels as further described in FIGS. 10a–e. Output of the non-linear amplifier is input into a/c coupling-filtering circuit 232, 234 or 56 as referenced in FIGS. 11a–c and FIG. 3. The output of the said filtered signal is input into comparator circuit 230, 231, or 60 and described in FIGS. 11a–c and FIG. 3. Output from said comparator circuit being input into secondary amplifier circuit 58 as described in FIG. 3. Subsequent to said secondary amplification, the signal is input into photosensor element selection circuit 320, wherein said selection circuit analyses signal outputs and address codes from adjacent responding elements utilizing weighted averaging means to determine to appropriate element address code used. Calibrated output from element selection circuit containing address code, corresponding to flash event location, and flash event detection signal is input to actuator device 340 and associated equipment 360, said calibrated output being using for direction finding purposes. Actuator device 340 output can be of analog or digital, wired, wireless, IR, UV, optical and/or RF formats to communicate with associated equipment 380.

Furthermore, photosensor array 300 can utilize filters 200 as described in FIG. 9, to be responsive to the spectral signature of the prescribed flash, e.g. muzzle flash. The non-linear feedback gain function as described in FIGS. 10a–e can also incorporate prescribed ambient light spectral filters as previously described again in FIG. 9. Furthermore, the said photosensors can incorporate view limiting devices such as lens, hood and/or fiber optic devices 420 to enhance resolution and/or sensitivity.

Figure 13B:
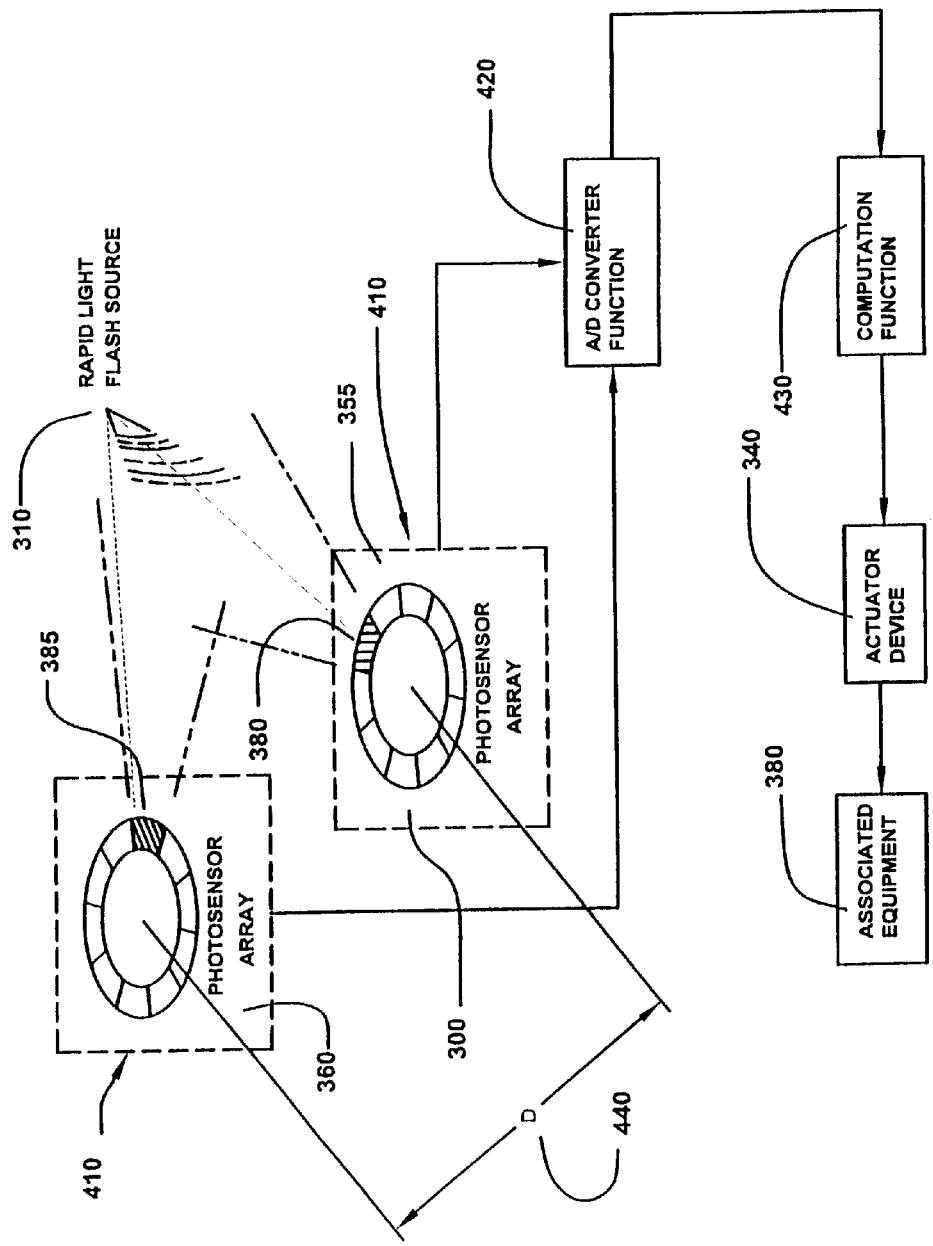

Referring now to FIG. 13b, there is shown an alternative embodiment of the lightning trigger device as shown in FIG. 13a wherein outputs from photosensor array 300 and photosensor array 360 are utilized to determine location and range of rapid pulse flash source 310. Photosensor array element 380 detects said rapid pulse flash source substantially concurrent with photosensor array element 385 wherein the output signals from said photosensor elements being independently amplified, filtered, re-amplified, and compared 355 and 360 to ambient conditions. Each of said photosensor elements having an assigned address as described in FIG. 13a. Furthermore, signal multiplexing methods can be used to minimize the number of amplification, filtering and comparator circuits necessary. Photosensor detection signal and address information from responsive photo sensor elements are input into multi-channel A/D converter device 420 to provide digital input into computing function 430. Furthermore, said computing function utilizes the input variables of time, photosensor element address code, orientation and photosensor array separation distance 440 to compute position location using algorithm methods such as direction finding, time of arrival, or time difference of arrival to determine range and azimuth information of the rapid pulse flash source. Furthermore, said computation function evaluates responses from adjacent photosensor elements utilizing weighting functions to determine the actual element address and input used in the computation function. Output from computation function is input into actuation device 340, e.g. targeting system wherein associated equipment 380, e.g. weapons system is activated. Since such positioning and location methods with the enumerated features are well known to those skilled in the art, further detailed discussion of the same is not deemed necessary.

The present invention may, of course, be carried out in other specific ways than those herein set forth without departing from the spirit and essential characteristics of such invention. The present embodiments are, therefore, to be considered in all respects as illustrative and not restrictive, and all changes coming within the meaning and equivalency range of the appended claims are intended to be embraced therein.

What is claimed:

1. A flash detection device comprising:
    a photosensor having a predetermined spectral sensitivity capable of detecting omni-directional light flash events of wavelengths including deep UV through far IR and producing an output signal in response thereto;
    an amplification means electrically connected to said photosensor for amplifying said output signal;
    a gain adjusting sensor connected to said amplifier for adjusting the gain of the device based on the difference between the ambient light levels and the flash event levels;
    a comparator means electrically connected to said gain adjusting sensor for monitoring said output signal, said comparator means discriminating between said flash event levels and said ambient light levels;
    timing means electrically connected to said comparator for receiving said output signal and maintaining said output signal for a predetermined time period; and
    detecting means electrically connected to said timing means for receiving said output signal therefrom.

2. A flash detection device as recited in claim 1 wherein said comparator means includes an integrated coupling circuit, said coupling circuit passing only that portion of said output signal produced by said photosensor in response to said flash events.

3. A flash detection device as recited in claim 2 wherein said integrated coupling circuit includes motion detection means.

4. A flash detection device as recited in claim 1 wherein said detecting means includes current-voltage circuit completion-interruption devices and input devices, e.g. isolation relay and/or digital/analog signal interface.

5. A flash detection device as recited in claim 1 wherein said detecting means includes a coded pulse generator.

6. A flash detection device as recited in claim 5 wherein said coded pulse generator processes UV, IR, optical and RF frequencies.

7. A flash detection device as recited in claim 5 wherein said coded pulse generator has single or simultaneous multiple channel frequency pulse codes and transmitter-receiver means.

8. A flash detection device as recited in claim 1 wherein the functions of said amplification means, said comparator means, said timing means and said detecting means are carried out by means selected from the group consisting of: a mixed signal processor having analog, digital, real time clock and non-volatile RAM memory, a programmable analog device, a digital signal processor, an analog to digital/digital to analog converter, a complex programmable logic device, a microprocessor, a microcontroller, a programmable gate array device, a reconfigurable computing device/adaptive computing machine (ACM) and an application specific integrated circuit.

9. A flash detection device as recited in claim 1 wherein said gain adjusting sensor is selected from the group consisting of photosensors and electromagnetic frequency sensors.

10. A flash detection device as recited in claim 1 including a camera operatively connected with said detecting means and having an automatic circuit for pre-activating an exposure metering system to reduce shutter lag time, and further including activation means for activating the metering system having delayed resetting means for ensuring proper exposure without premature release of the shutter, and means for providing a shutter release time delay.

11. A flash detection device as recited in claim 10 wherein said automatic circuit includes means for performing logic functions to achieve said shutter lag time reduction wherein said functions are performed by digital code and include connectivity and/or communications protocols for achieving initialization of camera and image acquisition.

12. A flash detection device as recited in claim 10 wherein said automatic circuit deletes said meter resetting means.

13. A flash detection device as recited in claim 10 wherein said automatic circuit includes a means for an external electrically isolated reset of said camera metering and shutter system.

14. A flash detection device as recited in claim 13 wherein said reset is performed by microprocessor, discrete logic, programmable logic, microcontroller, recongfigurable computing/ACM device or application specific devices.

15. A flash detection device as recited in claim 10 wherein fiber optic means are operatively coupled between said photosensor and a view finder of a camera and wherein said predetermined time period of said timing means is sufficiently long to prevent repetitive shutter actuation during the course of a single flash event.

16. A flash detection device of claim 1 wherein said photosensor means and gain adjusting sensor means are selected from the group comprising photocells, photodiodes, phototransistors, photoresistors, photomultipliers, charge coupled devices, image sensors, CMOS/CMOS X3 images sensors, MEMS/D-MEMS sensors, quantum well photodetectors and photosensor array devices.

17. A flash detection device as recited in claim 1 wherein said flash includes lightning, light and electromagnetic frequency events that are regulated or unregulated.

18. A flash detection device as recited in claim 1 wherein said amplification means are carried out by means selected from the group consisting of:
    transimpedance, transconductance, difference, summing, peak detecting, integrating, ratio and differentiating amplifier circuits.

19. A flash detection device for use in combination with associated equipment, said device comprising: photoresponsive means for detecting, light flash events of wavelengths including deep UV through far IR and producing an output signal in response thereto; means for operatively connecting said device to said associated equipment; an internal means of controlling the field of view detected by said photoresponsive means; and a multiple mode detection means wherein said light flash detection or cloud-ground lightning flash detection may be selected and wherein a predetermined time period is included by an actuator means controlling said associated equipment, said time period being sufficient to prevent undesired repetitive activation during the course of a single flash event.

20. A flash detection device as recited in claim 19 wherein said photoresponsive means is a photosensor and/or fiber optic means are operatively coupled between said photosensor and a viewfinder of a camera.

21. A flash detection device as recited in claim 19 wherein internal means includes a lens, hood, and/or fiber optic device.

22. A flash detection device as recited in claim 19 wherein predetermined spectral sensitivity is provided by a wavelength filtering lens and/or is light scattering or focusing.

23. A flash detection device as recited in claim 19 wherein said multiple mode-detection light flash detection means includes motion detection.

24. A flash detection device of claim 19 wherein said associated equipment is a camera having an automatic circuit for pre-activating an exposure metering system to reduce shutter lag time and includes means for activating said metering system having delayed resetting means to ensure proper exposure without premature release of the shutter releasing means by providing a shutter release time delay wherein said flash device and automatic circuit means are integrated within said camera body.

25. A flash detection device of claim 19 including a gain adjusting sensor for providing feedback gain adjustment and wherein said sensor is selected from the group consisting of photosensors and electromagnetic frequency sensors.

26. A flash detection device of claim 25 wherein said photosensors are electromagnetic frequency sensors having a view limiting device.

27. A flash detection device of claim 26 wherein said view limiting device is a wave guide.

28. A flash detection device as recited in claim 19 wherein said light flash events are regulated or unregulated, directed or omni-directional and include electromagnetic frequency flash events having the same said characteristics.

29. A flash detection device of claim 19 wherein said photoresponsive means include photosensors selected from the group comprising photocells, photodiodes, phototransistors, photoresistors, photomultipliers, charge coupled devices, image sensors, CMOS/CMOS X3 images sensors, MEMS/D-MEMS sensors, quantum well photodetectors and photosensor array devices.

30. A flash detection device as recited in claim 19 wherein said mode detection means passes only multiple flash impulses in response to characteristics of said cloud to ground lightning flash and repetitive flash pulses.

31. A flash detection device as recited in claim 19 wherein said mode detection means includes detection of rapid pulse light flashes, e.g. strobe, signal and muzzle flashes.

32. A flash detection device as recited in claim 19 wherein said selection mode detection means includes passing only substantially vertically or horizontally oriented light flashes characteristic of cloud to ground lightning flashes and/or polarized flashes.

33. A flash detection device as recited in claim 19 wherein said mode detection means includes means for activating said actuator means upon detection of a first flash impulse and resetting said actuator means if a second flash impulse is not detected within said predetermined time period.

34. A flash detection device as recited in claim 19 wherein said actuator means includes a coded pulse generator for use with associated equipment having an infrared receiver means.

35. A flash detection device as recited in claim 34 wherein said coded pulse generator processes UV, optical and RF frequencies.

36. A flash detection device as recited in claim 34 wherein said coded pulse generator has single or multiple channel frequency pulse codes and transmitter-receiver means for controlling associated equipment.

37. A flash detection device having enhanced sensitivity to detecting light flash events of wavelengths including deep UV through far IR comprising: a photosensor having a predetermined spectral sensitivity capable of detecting light flash events and producing an output signal in response thereto; a non-linear amplification means electrically connected to said photosensor providing a substantially constant sensitivity to varying ambient light and/or electromagnetic field levels while providing intensified amplification of said light flash event based on the difference between ambient and flash event light levels, wherein said non-linear amplification means provides substantially constant sensitivity to flash events within a selected intensity and/or distance; a feedback device electrically connected to said non-linear amplifier, said feedback device functioning to adjust the gain of the non-linear amplification means based on the difference between the ambient light levels and the flash event levels; a comparator means electrically connected to said non-linear amplifier for monitoring and enhancing sensitivity to said output signal, said comparator being capable of discriminating between flash event levels and ambient light levels to prevent false triggering; a timing circuit electrically connected to said comparator for receiving said output signal, said timing circuit functioning to maintain said output signal for a predetermined time period; and actuator means electrically connected to said timing circuit for receiving said output signal and effecting operation of an associated device.

38. The flash detection device as recited in claim 37 wherein said actuator means releases a shutter control device of a camera.

39. A flash detection device as recited in claim 37 wherein an autodarkening lens effects light levels incident upon said photosensors and/or feedback device as a function of ambient intensity, therein providing non-linear amplification and maintaining substantially constant ambient light and noise levels incident upon said sensors.

40. A flash detection device as recited in claim 37 wherein said flash event levels include motion detection.

41. A flash detection device as recited in claim 37 wherein said flash event levels include lightning flashes.

42. A flash detection device as recited in claim 37 wherein said actuator means is selected from a group comprising current-voltage circuit completion-interruption devices, input devices, e.g. isolation relay and/or digital/analog signal interface, infrared, UV, optical, and RF coded pulse generator transmitter receiver devices, and said devices having single and/or multiple channels.

43. A flash detection device as recited in claim 37 wherein said non-linear amplification means, gain feedback means, comparator means, timing means and actuating means are selected from the group consisting of a mixed signal processors integrated with the devices and having analog, digital real time clocks and non-volatile RAM memory; programmable analog devices, digital signal processors, analog to digital/digital to analog converters; complex programmable logic devices, microprocessor devices, microcontroller devices, programmable gate array devices, reconfigurable computing/adaptive computing machine (ACM) devices, and an application specific integrated circuits.

44. A flash detection device as recited in claim 37 wherein the output and gain functions of said non-linear amplifier are selected to provide substantially constant sensitivity to varying ambient light and noise levels while providing intensified amplification of flash pulses, and wherein said output and gain function of said non-linear amplifier are selected to provide substantially constant sensitivity to flash event within a selected intensity and/or distance.

45. A flash detection device as recited in claim 37 wherein said non-linear amplification means is selected from the group consisting of integrated and/or discrete devices having logarithmic/exponential, summing/difference, differential/integrating, ratio and programmable mathematical function analog, logic and/or digital amplifiers.

46. A flash detection device as recited in claim 37 wherein said feedback filtering-averaging means as selected from the group consisting of integrated and/or discrete R-C coupling devices, filtering devices, sample-hold devices, impulse response devices, programmable function logic, digital and analog devices, microprocessor devices, microcontroller devices, programmable gate array devices, reconfigurable computing/adaptive computing machine (ACM) devices, and application specific integrated circuit devices.

47. A flash detection device as recited in claim 37 wherein said comparator means is selected to provide a substantially constant sensitivity to varying ambient light and noise levels while providing intensified amplification of flash pulses.

48. A flash detection device as recited in claim 37 wherein said comparator means is selected from the group consisting of integrated and/or discrete logarithmic/exponential, summing/difference, differential/integrating, ratio and programmable mathematical function analog, logic and/or digital amplifiers and/or comparator devices.

49. A flash detection device as recited in claim 37 wherein said comparator means is a variable threshold device.

50. A flash detection device as recited in claim 37 wherein said variable threshold-event comparator is selected from the group comprising R-C coupling devices, filtering devices, sample-hold devices, impulse response devices, programmable function logic and analog devices, programmable gate array devices, microprocessor devices, microcontroller devices, reconfigurable computing/adaptive computing machine (ACM) devices, and application specific integrated circuit devices.

51. A flash detection device as recited in claim 37 wherein a linear amplification device provides the substantially constant sensitivity to varying ambient light and noise levels.

52. A flash detection device as recited in claim 37 wherein said sensors are electromagnetic frequency sensors.

53. A flash detection device as recited in claim 52 wherein said electromagnetic frequency sensors incorporate view limiting wave guides.

54. A flash detection device as recited in claim 37 wherein said feedback device is a sensor device selected from a group comprised of photosensors and electromagnetic frequency sensors.

55. A flash detection device as recited in claim 37 wherein said feedback device is a filtering-averaging means.

56. A flash detection device of claim 37 wherein said photosensors are selected from a group comprising photocells, photodiodes, phototransistors, photoresistors, photomultipliers, charge coupled devices, image sensors, CMOS/CMOS X3 image sensors, MEMS/D-MEMS photosensors, quantum well photodetectors and photosensor array devices.

57. A flash detection device as recited in claim 37 wherein said light flash events are regulated or unregulated, directed or omni-directional and include electromagnetic frequency flash events having the same said characteristics such as rapid pulse light flashes, lightning, strobe, signal and muzzle flashes.

58. A flash detection device as recited in claim 37 wherein said actuator means are selected from the group comprising current-voltage circuit completion-interruption devices, input devices, e.g. isolation relay and/or digital/analog signal interface, infrared, UV, optical, and RF coded pulse generator transmitter receiver devices, and said devices having single and/or multiple channels.

59. A flash detection device as recited in claim 37 wherein said photosensors having a means for controlling the field of view is included, such as a lens, hood, and/or fiber optic device.

60. A flash detection device as recited in claim 37 wherein said photosensors having predetermined spectral sensitivity means provided by a wavelength filtering lens and/or is light scattering or focusing.

61. A flash detection device for use in combination with an associated equipment, said device comprising: a photoresponsive array sensor means for detecting directed electromagnetic frequency and light flash events of wavelengths including deep UV through far IR and producing an output response and having an assigned address signal simultaneously output thereto; an amplification means electrically connected to said photosensor array providing a substantially constant sensitivity to varying ambient light and/or electromagnetic field levels while providing intensified amplification of said event based on the difference between ambient and flash event levels, wherein said amplification means provides substantially constant sensitivity to flash events within a selected intensity and/or distance; a feedback device electrically connected to said amplification, said feedback device functioning to automatically adjust the gain of the amplification means based on the difference between the ambient light levels and the flash event levels; an analog to digital signal converter means for digitally converting said intensified output response of the amplification means; a computation means connected to said amplification means for the purpose of receiving said digitally converted response and simultaneous address signal and wherein said computation means computes range and azimuth to said flash source from said output response and said address signal and therein driving an actuator means, said actuator means controlling associated equipment in response thereof to the position and location of said flash source.

62. A flash detection device as recited in claim 61 wherein said photoresponsive array sensor elements include physical address assignment outputs.

63. A flash detection device as recited in claim 61 wherein said photoresponsive array sensor include multiple sensor arrays and wherein said sensor arrays are separated by a prescribed distance for the purpose of determining the position and location of said flash source.

64. A flash detection device as recited in claim 61 wherein said photoresponsive array sensor is constructed of a plurality of sensor elements each having a physical address for the purpose of identifying said element and corresponding orientation.

65. A flash detection device as recited in claim 61 wherein said photoresponsive array elements having a means for controlling the field of view is included, such as a lens, hood, and/or fiber optic device.

66. A flash detection device as recited in claim 61 wherein said photoresponsive array elements having a predetermined spectral sensitivity means provided by a wavelength filtering lens and/or is light scattering or focusing.

67. A flash detection device as recited in claim 61 wherein said amplification means includes linear and non-linear amplification means.

68. A flash detection device as recited in claim 67 wherein said amplification means is comprised of a group consisting of integrated and/or discrete linear, logarithmic/exponential, summing/difference, differential/integrating, ratio and programmable mathematical function analog, logic and/or digital amplifiers.

69. A flash detection device as recited in claim 61 wherein said feedback device is a sensor device selected from a group comprised of photosensors and electromagnetic frequency sensors having spectral and/or intensity sensitivity, and/or is a filtering-averaging analog/digital device.

70. A flash detection device as recited in claim 69 wherein said feedback device are photosensors selected from a group comprising photocells, photodiodes, phototransistors, photoresistors, photomultipliers, charge coupled devices, image sensors, CMOS/CMOS X3 image sensors, MEMS/D-MEMS photosensors, quantum well photodetectors and photosensor array devices.

71. A flash detection device as recited in claim 61 wherein said photoresponsive array sensor elements are photosensors selected from a group comprising photocells, photodiodes, phototransistors, photoresistors, photomultipliers, charge coupled devices, image sensors, CMOS/CMOS X3 image sensors, MEMS/D-MEMS photosensors, quantum well photodetectors.

72. A flash detection device as recited in claim 61 wherein a comparator means is electrically connected to said amplification means and computing means for monitoring said output signal, said comparator being capable of discriminating between flash event levels and ambient light levels to prevent a false response input into said computing means.

73. A flash detection device as recited in claim 72 wherein said comparator means is a variable-threshold comparator having enhanced sensitivity to said output signal and is selected from the group comprising R-C coupling devices, filtering devices, sample-hold devices, impulse response devices, programmable function logic and analog devices, programmable gate array devices, microprocessor devices, microcontroller devices, reconfigurable computing/adaptive computing machine (ACM) devices, and application specific integrated circuit devices.

74. A flash detection device as recited in claim 61 wherein said computation means is a computing device and wherein said photosensor array output response and said array element array address signal are received and wherein a position location algorithm processes said signals and computes direction, distance and/or coordinates of said flash event source.

75. A flash detection device as recited in claim 61 wherein said actuator is selected from a group comprising linear and rotary positioning devices, tracking devices, current-voltage circuit completion-interruption devices, input devices, e.g. isolation relay and/or digital/analog signal interface, infrared, UV, optical, and RF coded pulse generator transmitter receiver devices, and said devices having single and/or multiple channels.

76. A flash detection device as recited in claim 61 wherein said associated device means is selected from a group comprising photographic devices, recording devices, alert devices, targeting and weapon devices.

77. A flash detection device as recited in claim 61 wherein said light flash events are regulated or unregulated, omnidirectional and include electromagnetic frequency flash events having the same said characteristics such as rapid pulse light flashes, lightning, strobe, signal and muzzle flashes.

* * * * *